(12) United States Patent
Yoon et al.

(10) Patent No.: US 11,127,944 B2
(45) Date of Patent: Sep. 21, 2021

(54) BLENDED CATHODE MATERIALS

(71) Applicant: A123 Systems, LLC, Waltham, MA (US)

(72) Inventors: Sang-Young Yoon, Bedford, MA (US); Rocco Iocco, Beverly, MA (US); Jeong Ju Cho, Lexington, MA (US)

(73) Assignee: A123 Systems, LLC, Waltham, MA (US)

( * ) Notice: Subject to any disclaimer, the term of this patent is extended or adjusted under 35 U.S.C. 154(b) by 400 days.

(21) Appl. No.: 14/162,866

(22) Filed: Jan. 24, 2014

(65) Prior Publication Data

US 2014/0138591 A1 May 22, 2014

Related U.S. Application Data

(63) Continuation of application No. PCT/US2012/048148, filed on Jul. 25, 2012.

(Continued)

(51) Int. Cl.
*H01M 4/36* (2006.01)
*H01M 4/58* (2010.01)
(Continued)

(52) U.S. Cl.
CPC .......... *H01M 4/364* (2013.01); *C01B 25/45* (2013.01); *H01M 4/505* (2013.01); *H01M 4/525* (2013.01);
(Continued)

(58) Field of Classification Search
CPC ................. H01B 1/08; H01M 4/364
(Continued)

(56) References Cited

U.S. PATENT DOCUMENTS 5,614,334 A 3/1997 Kamauchi et al.
5,871,863 A * 2/1999 Miyasaka .......... C01G 45/1221
429/218.1
(Continued)

FOREIGN PATENT DOCUMENTS

CN 1615554 A 5/2005
EP 1094532 A1 4/2001
(Continued)

OTHER PUBLICATIONS

Yang, H. et al., "Evaluation of Electrochemical Interface Area and Lithium Diffusion Coefficient for a Composite Graphite Anode," Journal of The Electrochemical Society, vol. 151, No. 8, Available Online Jul. 19, 2004, 4 pages.
(Continued)

*Primary Examiner* — William D Young
(74) *Attorney, Agent, or Firm* — McCoy Russell LLP (57) ABSTRACT

A positive electroactive material is described, including: a lithium iron manganese phosphate compound having a composition of $Li_aFe_{1-x-y}Mn_xD_y(PO_4)_z$, wherein $1.0 < a \leq 1.10$, $0 < x \leq 0.5$, $0 \leq y \leq 0.10$, $1.0 < z \leq 1.10$ and D is selected from the group consisting of Co, Ni, V, Nb and combinations thereof; and a lithium metal oxide, wherein the lithium iron manganese phosphate compound is optionally doped with Ti, Zr, Nb, Al, Ta, W, Mg or F. A battery containing the positive electroactive material is also described.

22 Claims, 4 Drawing Sheets

Related U.S. Application Data (60) Provisional application No. 61/524,532, filed on Aug. 17, 2011, provisional application No. 61/511,280, filed on Jul. 25, 2011.

(51) Int. Cl.
  *H01M 4/505* (2010.01)
  *C01B 25/45* (2006.01)
  *H01M 4/525* (2010.01)
  *H01M 10/0525* (2010.01)

(52) U.S. Cl.
  CPC ...... *H01M 4/5825* (2013.01); *H01M 10/0525* (2013.01)

(58) Field of Classification Search
  USPC .................................................... 252/518.1
  See application file for complete search history.

(56) References Cited

U.S. PATENT DOCUMENTS

| | | | |
|---|---|---|---|
| 6,451,487 B1 | 9/2002 | Besner et al. | |
| 6,670,074 B2 | 12/2003 | Spillman | |
| 6,902,848 B1 | 6/2005 | Izuchi et al. | |
| 7,026,074 B2 | 4/2006 | Chen et al. | |
| 7,041,239 B2 | 5/2006 | Barker et al. | |
| 7,189,475 B2 | 5/2007 | Sasaki et al. | |
| 7,217,474 B2 | 5/2007 | Yamada et al. | |
| 7,255,957 B2 | 8/2007 | Takahashi et al. | |
| 7,338,734 B2 | 3/2008 | Chiang et al. | |
| 7,358,009 B2 | 4/2008 | Johnson et al. | |
| 7,771,628 B2* | 8/2010 | Barker | H01M 4/13 252/521.2 |
| 7,803,485 B2 | 9/2010 | Takezawa et al. | |
| 7,927,732 B2 | 4/2011 | Myerberg et al. | |
| 7,939,201 B2 | 5/2011 | Chiang et al. | |
| 8,062,560 B2 | 11/2011 | Xi et al. | |
| 8,062,794 B2 | 11/2011 | Hosoya et al. | |
| 8,187,735 B2 | 5/2012 | Chiang et al. | |
| 8,470,207 B2* | 6/2013 | Xu | B82Y 30/00 241/27 |
| 9,178,215 B2* | 11/2015 | Beck | H01B 1/122 |
| 2002/0004169 A1 | 1/2002 | Yamada et al. | |
| 2002/0106563 A1 | 8/2002 | Okawa et al. | |
| 2002/0106564 A1 | 8/2002 | Okawa et al. | |
| 2004/0005265 A1 | 1/2004 | Chiang et al. | |
| 2004/0096743 A1 | 5/2004 | Okae et al. | |
| 2006/0014076 A1 | 1/2006 | Donoue et al. | |
| 2006/0099495 A1 | 5/2006 | Suzuki et al. | |
| 2006/0194112 A1 | 8/2006 | Barker et al. | |
| 2006/0222946 A1 | 10/2006 | Okada et al. | |
| 2006/0292444 A1 | 12/2006 | Chiang et al. | |
| 2007/0057228 A1 | 3/2007 | Huang et al. | |
| 2007/0082265 A1 | 4/2007 | Itou et al. | |
| 2007/0141468 A1 | 6/2007 | Barker | |
| 2008/0038635 A1 | 2/2008 | Sheem et al. | |
| 2008/0067972 A1 | 3/2008 | Takami et al. | |
| 2008/0085454 A1 | 4/2008 | Ihara et al. | |
| 2008/0113267 A1 | 5/2008 | Jouanneau et al. | |
| 2008/0116423 A1 | 5/2008 | Fan et al. | |
| 2008/0118847 A1 | 5/2008 | Jung et al. | |
| 2008/0241705 A1 | 10/2008 | Wakita et al. | |
| 2008/0254368 A1 | 10/2008 | Ooyama et al. | |
| 2008/0286655 A1* | 11/2008 | Inoue | H01M 4/136 429/231.95 |
| 2009/0081534 A1 | 3/2009 | Takami et al. | |
| 2009/0087709 A1 | 4/2009 | Zaghib et al. | |
| 2009/0123813 A1 | 5/2009 | Chiang et al. | |
| 2009/0123837 A1 | 5/2009 | Gratzel et al. | |
| 2009/0123839 A1 | 5/2009 | Soma et al. | |
| 2009/0123845 A1 | 5/2009 | Zaghib et al. | |
| 2009/0186276 A1 | 7/2009 | Zhamu et al. | |
| 2009/0186277 A1 | 7/2009 | Beck et al. | |
| 2009/0246636 A1 | 10/2009 | Chiang et al. | |
| 2009/0286157 A1 | 11/2009 | Chen et al. | |
| 2009/0297950 A1 | 12/2009 | Zhao et al. | |
| 2009/0301866 A1 | 12/2009 | Zaghib et al. | |
| 2009/0305132 A1 | 12/2009 | Gauthier et al. | |
| 2010/0015509 A1 | 1/2010 | Inagaki et al. | |
| 2010/0040954 A1 | 2/2010 | Amine et al. | |
| 2010/0062339 A1 | 3/2010 | Pan et al. | |
| 2010/0075225 A1 | 3/2010 | Wilkins et al. | |
| 2010/0173197 A1 | 7/2010 | Li et al. | |
| 2010/0183925 A1 | 7/2010 | Manthiram et al. | |
| 2010/0190058 A1 | 7/2010 | Thackeray et al. | |
| 2010/0203388 A1 | 8/2010 | Kim et al. | |
| 2010/0209778 A1 | 8/2010 | Jouanneau-Si Larbi et al. | |
| 2010/0248028 A1 | 9/2010 | Riley, Jr. et al. | |
| 2010/0248038 A1* | 9/2010 | Takami | H01M 4/364 429/332 |
| 2010/0261067 A1 | 10/2010 | Pitts et al. | |
| 2010/0327221 A1 | 12/2010 | Koga et al. | |
| 2011/0012067 A1 | 1/2011 | Kay | |
| 2011/0042609 A1 | 2/2011 | Park et al. | |
| 2011/0042610 A1 | 2/2011 | Cho et al. | |
| 2011/0052988 A1 | 3/2011 | Beck et al. | |
| 2011/0052991 A1 | 3/2011 | Kim et al. | |
| 2011/0076564 A1 | 3/2011 | Yu et al. | |
| 2011/0081578 A1 | 4/2011 | Chang et al. | |
| 2011/0086248 A1 | 4/2011 | Nakura | |
| 2011/0086274 A1 | 4/2011 | Chang et al. | |
| 2011/0165462 A1 | 7/2011 | Zhamu et al. | |
| 2011/0223482 A1 | 9/2011 | Fujii et al. | |
| 2011/0311872 A1 | 12/2011 | Oh et al. | |
| 2011/0318613 A1 | 12/2011 | Hohenthanner et al. | |
| 2011/0318651 A1 | 12/2011 | Leitner et al. | |

FOREIGN PATENT DOCUMENTS

| | | |
|---|---|---|
| JP | 2010225486 A | 10/2010 |
| JP | 2011517361 A | 6/2011 |
| KR | 20090113897 A | 11/2009 |
| WO | 03056646 A1 | 7/2003 |

OTHER PUBLICATIONS

Alcantara, R. et al., "Synergistic Effects of Double Substitution in $LiNi_{0.5-y}Fe_yMn_{1.5}O_4$ Spinel as 5 V Cathode Materials," Journal of The Electrochemical Society, vol. 152, No. 1, Available Online Nov. 17, 2004, 6 pages.

Kuo, H. et al., "Effect of Co2P on electrochemical performance of $Li(Mn_{0.35}Co_{0.2}Fe_{0.45})PO_4/C$," Journal of Physical Chemistry, vol. 112, No. 27, Available Online Jun. 18, 2008, 7 pages.

Jensen, K. et al., "Real-time synchrotron powder X-ray diffraction study of the antisite defect formation during sub-and supercritical synthesis of $LiFePO_4$ and $LiFe_{1-x}Mn_xPO_4$ nanoparticles," Journal of Applied Crystallography, vol. 44, No. 2, Apr. 2011, 8 pages.

Yoncheva, M. et al., "Carbon-coated nano-sized $LiFe_{1-x}Mn_xPO_4$ solid solutions ($0 \leq x \leq 1$) obtained from phosphate-formate precursors," Journal of Materials Science, vol. 46, No. 22, Nov. 2011, Available Online Apr. 22, 2011, 8 pages.

ISA United States Patent and Trademark Office, International Search Report Issued in Application No. PCT/US12/48148, dated Oct. 1, 2012, WIPO, 2 pages.

European Patent Office, Extended European Search Report Issued in Application No. 12817837.3, dated Mar. 9, 2015, Germany, 8 pages.

State Intellectual Property Office of the People's Republic of China, First Office Action Issued in Chinese Patent Application No. 201280044780.9, dated Aug. 25, 2015, 21 pages.

Japan Patent Office, Office Action Issued in Application No. 2014-522966, dated Aug. 2, 2016, 11 pages. (Submitted with Unofficial Translation).

Korean Intellectual Property Office, Office Action Issued in Application No. 10-2014-7004846, dated Jul. 20, 2018, Korea, 19 pages.

\* cited by examiner

BLENDED CATHODE MATERIALS

RELATED APPLICATIONS

The present application is a continuation of PCT/US2012/048148, filed Jul. 25, 2012 and published on Jan. 31, 2013 as WO 2013/016426, which claims the benefit of the earlier filing date of U.S. Patent Application Ser. No. 61/511,280, filed on Jul. 25, 2011; and 61/524,532, filed on Aug. 17, 2011, the contents of which are hereby incorporated by reference herein in their entireties.

The present application is related to U.S. patent application Ser. No. 10/329,046, filed on Dec. 23, 2002, now U.S. Pat. No. 7,338,734, the content of which is hereby incorporated by reference herein in its entirety.

The present application is also related to U.S. patent application Ser. No. 12/868,530, filed on Aug. 25, 2010, the content of which is hereby incorporated by reference herein in its entirety.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

Batteries produce energy from electrochemical reactions. Batteries typically include a positive electrode and a negative electrode; an ionic electrolyte solution that supports the movement of ions back and forth between the two electrodes; and a porous separator that ensures the two electrodes do not touch but allows ions to travel back and forth between the electrodes.

Contemporary portable electronic appliances rely almost exclusively on rechargeable lithium (Li)-ion batteries as the source of power. This has spurred a continuing effort to increase their energy storage capability, power capabilities, cycle life and safety characteristics, and decrease their cost. Lithium-ion battery or lithium ion cell refers to a rechargeable battery having a negative electrode capable of storing a substantial amount of lithium at a lithium chemical potential above that of lithium metal. When a lithium-ion battery is charged, lithium ions travel from the positive electrode to the negative electrode. On discharge, these ions return to the positive electrode releasing energy in the process.

In a Li-ion battery, the cell includes lithium transition metal oxides for the positive electrode (or cathode), carbon/graphite for the negative electrode (or anode), and a lithium salt in an organic solvent for the electrolyte. In addition to lithium transition metal oxides, more recently, lithium metal phosphates have been used as a cathode electroactive material.

However, there are certain drawbacks associated with the current lithium ion positive electrode active materials. Specifically, lithium transition metal oxide materials, although having higher energy density, usually result in a battery with the problem of thermal run away under high temperatures. Usually, to improve the abuse tolerance performance, ceramic resistive layers are coated on the separator or electrodes. This adds additional cost to the cell.

Conversely, lithium transition metal phosphate materials, while having good intrinsic thermal safety, suffer from low electronic conductivity and relatively lower energy density, at least in part due to the inherent properties of the lithium transition metal phosphate powder which includes lower cell potential, low intrinsic density, and poor packing density attributed to its small particle size.

SUMMARY

The present invention provides a high energy density lithium ion battery material with improved thermal safety.

In certain embodiments, a positive electroactive material is described. The positive electroactive material includes a lithium iron manganese phosphate compound having a composition of $Li_aFe_{1-x-y}Mn_xD_y(PO_4)_z$, wherein $1.0 < a \leq 1.10$, $0 < x \leq 0.5$, $0 \leq y \leq 0.10$, $1.0 < z \leq 1.10$ and D is selected from the group consisting of Co, Ni, V, Nb and combinations thereof; and a lithium metal oxide, wherein the lithium iron manganese phosphate compound is optionally doped with Ti, Zr, Nb, Al, Ta, W, Mg or F.

In certain embodiments, the nanoscale lithium iron manganese phosphate compound is $LiFe_{1-x}Mn_xPO_4$ and $0.400 < x < 0.500$.

In certain embodiments, the nanoscale lithium iron manganese phosphate compound is $LiFe_{1-x}Mn_xPO_4$ and $x \leq 0.450$.

In certain embodiments, the nanoscale lithium iron manganese phosphate compound is $Li_aFe_{1-x-y}Mn_xD_yPO_4$ and $x < 0.500$ and $0.001 < y < 0.100$.

In certain embodiments, the nanoscale lithium iron manganese phosphate compound is $Li_aFe_{1-x-y}Mn_xD_yPO_4$ and $x < 0.500$ and $0.001 < y < 0.050$.

In certain embodiments, the nanoscale lithium iron manganese phosphate compound is $Li_aFe_{1-x-y}Mn_xCo_yPO_4$ and $x < 0.500$ and $0.001 < y < 0.050$.

In certain embodiments, the nanoscale lithium iron manganese phosphate compound is $Li_aFe_{1-x-y}Mn_xNi_yPO_4$ and $x < 0.500$ and $0.001 < y < 0.050$.

In certain embodiments, the nanoscale lithium iron manganese phosphate compound is $Li_aFe_{1-x-y}Mn_xV_yPO_4$ and $x < 0.500$ and $0.001 < y < 0.050$.

In certain embodiments, the nanoscale lithium iron manganese phosphate compound is one or more electroactive materials selected from the group consisting of $Li_{1.025}Fe_{0.580}Mn_{0.400}Co_{0.020}PO_4$, $Li_{1.025}Fe_{0.530}Mn_{0.450}Co_{0.020}PO_4$, $Li_{1.025}Fe_{0.480}Mn_{0.500}Co_{0.010}Ni_{0.010}PO_4$, $Li_{1.050}Fe_{0.500}Mn_{0.450}Co_{0.010}Ni_{0.010}V_{0.030}(PO_4)_{1.025}$, $Li_{1.040}Fe_{0.560}Mn_{0.400}Co_{0.010}Ni_{0.010}V_{0.020}(PO_4)_{1.015}$, $Li_{1.040}Fe_{0.510}Mn_{0.450}Co_{0.010}Ni_{0.010}V_{0.020}(PO_4)_{1.015}$, $Li_{1.030}Fe_{0.520}Mn_{0.450}Co_{0.010}Ni_{0.010}V_{0.010}(PO_4)_{1.005}$, $Li_{1.040}Fe_{0.510}Mn_{0.450}Co_{0.010}Ni_{0.010}V_{0.030}(PO_4)_{1.010}F_{0.015}$, $Li_{1.000}Fe_{0.460}Mn_{0.500}Co_{0.040}PO_4$, $Li_{1.000}Fe_{0.460}Mn_{0.500}Co_{0.040}PO_4$, $Li_{1.000}Fe_{0.530}Mn_{0.450}Co_{0.010}Ni_{0.010}PO_4$, $Li_{0.050}Fe_{0.510}Mn_{0.450}Co_{0.0100}Ni_{0.005}V_{0.025}(PO_4)_{1.0205}$, $Li_{1.050}Fe_{0.500}Mn_{0.450}Co_{0.010}Nb_{0.010}V_{0.030}(PO_4)_{1.025}$, $Li_{1.040}Fe_{0.560}Mn_{0.400}Co_{0.010}Nb_{0.010}V_{0.0200}(PO_4)_{1.015}$, $Li_{1.040}Fe_{0.510}Mn_{0.450}Co_{0.010}Nb_{0.010}V_{0.020}(PO_4)_{1.015}$, $Li_{1.030}Fe_{0.520}Mn_{0.450}Co_{0.010}Nb_{0.010}V_{0.010}(PO_4)_{1.0055}$, $Li_{1.040}Fe_{0.510}Mn_{0.450}Co_{0.010}Nb_{0.010}V_{0.030}(PO_4)_{1.010}F_{0.015}$, and $Li_{1.050}Fe_{0.510}Mn_{0.450}Co_{0.0100}Nb_{0.005}V_{0.025}(PO_4)_{1.020}$.

In certain embodiments, the lithium metal oxide is selected from the group consisting of lithium nickel cobalt aluminum oxide (NCA), lithium nickel cobalt magnesium oxide (NCMg), lithium nickel cobalt, manganese oxide (NCM), lithium nickel cobalt rare earth oxide (NCRE), spinel lithium manganese oxide (LMO), layered layered oxide cathode (LLC), lithium cobalt oxide (LCO), layered Mn oxide, and combinations thereof.

In certain embodiments, the lithium metal oxide is a lithium nickel cobalt manganese oxide (NCM).

In certain embodiments, the lithium metal oxide is a lithium nickel cobalt aluminum oxide (NCA).

In certain embodiments, the lithium metal oxide is lithium nickel cobalt manganese oxide (NCM) and the lithium iron manganese phosphate is $LiFe_{1-x}Mn_xPO_4$ wherein $0.400 < x \leq 0.450$.

In certain embodiments, the positive electrode active material further comprising additional lithium transition metal polyanion compounds.

In certain embodiments, the positive electrode active material comprises from about 10-90% of the lithium iron manganese phosphate compound.

In certain embodiments, the positive electrode active material comprises from about 40-70% of the lithium iron manganese phosphate compound.

In certain embodiments, the lithium iron manganese phosphate compound is in the form of particulates having a size of about 100 nm or less.

In certain embodiments, the lithium iron manganese phosphate compound is in the form of particulates having a specific surface area greater than about 5 $m^2/g$.

In certain embodiments, the lithium iron manganese phosphate compound is in the form of particulate; the lithium metal oxide is in the form of particulate; and the ratio of specific surface areas between the lithium iron manganese phosphate compound and the lithium metal oxide is between 0.5 to 500.

In certain embodiments, a lithium ion battery comprising a positive electrode comprising the positive electrode active material described herein is disclosed.

In certain embodiments, the lithium ion battery includes a graphite anode.

BRIEF DESCRIPTION OF THE DRAWING

A more complete appreciation of the present invention and many of its advantages will be understood by reference to the following detailed description when considered in connection with the following drawings, which are presented for the purpose of illustration only are not intended to limit the scope of the appended claims, and in which:

DETAILED DESCRIPTION

Definitions

As used herein, a "dopant metal" refers to a metal that can be doped into (or substituted for an element of) an electroactive material of a positive electrode, either into or between the lattice sites of the electractive material. In certain embodiment, the dopant metal is present at a small concentration (relative to that of the electroactive metal) or has a redox potential significantly different from the electroactive metal so that the dopant metal does not significantly contribute to the electric storage capacity in an electrochemical cell.

As used herein, an "olivine structure" refers to a compound composed of isolated tetrahedral $PO_4$ anionic groups and M1 and M2 cations surrounded by six oxygen ions. Generally, the olivine structure exhibits orthorhombic 2 mm crystal symmetry and has a plurality of planes defined by zigzag chains and linear chains. The M1 cations generally occupy the zigzag chains of octahedral sites and M2 cations generally occupy the linear chains of alternate planes of the octahedral sites. The lattices sites can be doped with other dopant metals and nevertheless maintain the olivine structure.

As used herein, an "olivinic phase" is any crystalline phase having the olivine structure. The olivinic phase can include one or more dopant metals substituted into the lattice structure of the olivine structure. For example, the olivinic phase can be based on lithium-iron-manganese-phosphate (LFMP) material having an olivine structure that is doped with one or more dopant metals in the lattice sites of the olivine structure.

As used herein, an "olivine compound" refers to a material having an olivine structure.

As used herein, a "stoichiometric olivine compound" refers to the relative amount of phosphate and non-lithium metals in the lithium iron phosphate lattice. A stoichiometric olivine compound contains non-lithium metal in an amount sufficient to occupy the M2 site of the olivine lattice. For example, for the stoichiometric olivine compound $LiFeMnPO_4$, the ratio of $Fe+Mn:PO_4$, is 1:1 in a stoichiometric olivine compound. For the olivine compound Li—Fe—Mn—Co—Ni—V—$PO_4$, the ratio of $Fe+Mn+Co+Ni+V:PO_4$ is 1:1 in a stoichiometric olivine compound. A "non-stoichiometric olivine compound" has non-lithium metals in excess or in deficit of that needed to fill the M2 lattice cites. A non-metal:phosphate ratio of greater than or less than 1.0 gives rise to a non-stoichiometric olivine compound.

As used herein, "excess phosphate" or "phosphate-rich" refers to the amount of phosphate in the overall composition in excess of that needed to form the stoichiometric olivine compound. A non-metal:phosphate ratio of less than 1.0 gives rise to a non-stoichiometric olivine compound that is phosphate-rich.

As used herein, "rhombohedral phase" is any crystalline phase having the rhombohedral structure. The rhombohedral phase can include one or more dopant metals substituted into the lattice structure of the rhombohedral structure. For example, the rhombohedral phase can be based on lithium-nickel-cobalt-manganese-oxide (NCM) material having a rhombohedral structure that is doped with one or more dopant metals in the lattice sites of the rhombohedral structure.

As used herein, a "rhombohedral compound" refers to a material having a rhombohedral structure.

As used herein, a "stoichiometric rhombohedral compound" refers to the relative amount of oxygen and non-lithium metals in a rhombohedral metal oxide compound. A stoichiometric olivine compound contains non-lithium metal in an amount sufficient to occupy the non-lithium metal site of the rhombohedral lattice. For example, if the rhombohedral compound is $LiNiCoMnO_2$, the ratio of $Li:Ni+Co+Mn:O_2$ is 1:1:1 in a stoichiometric rhombohedral compound. A non-lithium metal:oxygen ratio of greater than or less than 1.0 gives rise to a non-stoichiometric olivine compound.

As used herein, "excess lithium" or "lithium rich" refers to the amount of lithium in the overall composition in excess of that needed to form the stoichiometric olivine or rhombohedral compound.

As used herein, "solid solution" refers a mixture of different atomic cations and anions that have arranged themselves into a single lattice structure, such as the olivine structure. For example, olivine compounds, such as LFMP and dopant metals, existing together as an olivinic phase, can be referred to as a solid solution. As another example, rhombohedral compounds, such as NCM and dopant metals, existing together as a rhombohedral phase can be referred to as a solid solution.

As used herein, the term "specific capacity" refers to the capacity per unit mass of the electroactive material in the positive electrode and has units of milliamps-hour/gram (mAh/g).

As used herein, the term "energy density" refers the amount of energy a battery has in relation to its size. Energy density is the total amount of energy (in Wh) a battery can store per amount of the electroactive material in the positive electrode for a specified rate of discharge.

As used herein, the charge/discharge rates are reported in units of the C-rate conversion, or C/n, where n is the time (hour) for complete charge or discharge at the nominal capacity measured at low rates, here taken to be 150 mAh/g. For instance, if a 1C rate corresponds to a current rate of 150 mA/g, which in the ideal case gives complete constant current discharge in 1 hour, then a 20C rate corresponds to 3 A/g, discharging with constant current in 3 min.

As used herein, "efficiency" of a battery corresponds to the ratio of charge and discharge capacity.

Blend of Lithium Iron Manganese Phosphate (LFMP) with Lithium Metal Oxide

In one aspect, a positive electroactive material comprising a mixture of a lithium iron manganese phosphate compound (LFMP) and a lithium metal oxide is described.

In certain embodiments, a positive electroactive material is described. The positive electroactive material includes a lithium iron manganese phosphate compound having a composition of $Li_aFe_{1-x-y}Mn_xD_y(PO_4)_z$, wherein $1.0<a\leq1.10$, $0<x\leq0.5$, $0\leq y\leq0.10$, $1.0<z\leq1.10$ and D is selected from the group consisting of Co, Ni, V, Nb and combinations thereof; and a lithium metal oxide, wherein the lithium iron manganese phosphate compound is optionally doped with Ti, Zr, Nb, Al, Ta, W, Mg or F.

In certain embodiments, the nanoscale lithium iron manganese phosphate compound is $LiFe_{1-x}Mn_xPO_4$ and $0.400<x<0.500$.

In certain embodiments, the nanoscale lithium iron manganese phosphate compound is $LiFe_{1-x}Mn_xPO_4$ and $x\leq0.450$.

In certain embodiments, the nanoscale lithium iron manganese phosphate compound is $Li_aFe_{1-x-y}Mn_xD_yPO_4$ and $x<0.500$ and $0.001<y<0.100$.

In certain embodiments, the nanoscale lithium iron manganese phosphate compound is $Li_aFe_{1-x-y}Mn_xD_yPO_4$ and $x<0.500$ and $0.001<y<0.050$.

In certain embodiments, the nanoscale lithium iron manganese phosphate compound is $Li_aFe_{1-x-y}Mn_xCo_yPO_4$ and $x<0.500$ and $0.001<y<0.050$.

In certain embodiments, the nanoscale lithium iron manganese phosphate compound is $Li_aFe_{1-x-y}Mn_xNi_yPO_4$ and $x<0.500$ and $0.001<y<0.050$.

In certain embodiments, the nanoscale lithium iron manganese phosphate compound is $Li_aFe_{1-x-y}Mn_xV_yPO_4$ and $x<0.500$ and $0.001<y<0.050$.

In certain embodiments, the nanoscale lithium iron manganese phosphate compound is one or more electroactive materials selected from the group consisting of $Li_{1.025}Fe_{0.580}Mn_{0.400}Co_{0.020}PO_4$, $Li_{1.025}Fe_{0.530}Mn_{0.450}Co_{0.020}PO_4$, $Li_{1.025}Fe_{0.480}Mn_{0.500}Co_{0.010}Ni_{0.010}PO_4$, $Li_{1.050}Fe_{0.500}Mn_{0.450}Co_{0.010}Ni_{0.010}V_{0.030}(PO_4)_{1.025}$, $Li_{1.040}Fe_{0.560}Mn_{0.400}Co_{0.010}Ni_{0.010}V_{0.020}(PO_4)_{1.015}$, $Li_{1.040}Fe_{0.510}Mn_{0.450}Co_{0.010}Ni_{0.010}V_{0.020}(PO_4)_{1.015}$, $Li_{1.030}Fe_{0.520}Mn_{0.450}Co_{0.010}Ni_{0.010}V_{0.010}(PO_4)_{1.005}$, $Li_{1.040}Fe_{0.510}Mn_{0.450}Co_{0.010}Ni_{0.010}V_{0.030}(PO_4)_{1.010}F_{0.015}$, $Li_{1.000}Fe_{0.460}Mn_{0.500}Co_{0.040}PO_4$, $Li_{1.000}Fe_{0.460}Mn_{0.500}Co_{0.040}PO_4$, $Li_{1.000}Fe_{0.530}Mn_{0.450}Co_{0.010}Ni_{0.010}PO_4$, $Li_{1.050}Fe_{0.510}Mn_{0.450}Co_{0.0100}Ni_{0.005}V_{0.025}(PO_4)_{1.020}$, $Li_{1.050}Fe_{0.500}Mn_{0.450}Co_{0.010}Nb_{0.010}V_{0.030}(PO_4)_{1.025}$, $Li_{1.040}Fe_{0.560}Mn_{0.400}Co_{0.010}Nb_{0.010}V_{0.020}(PO_4)_{1.015}$, $Li_{1.040}Fe_{0.510}Mn_{0.450}Co_{0.010}Nb_{0.010}V_{0.020}(PO_4)_{1.015}$, $Li_{1.030}Fe_{0.520}Mn_{0.450}Co_{0.010}Nb_{0.010}V_{0.010}(PO_4)_{1.005}$, $Li_{1.040}Fe_{0.510}Mn_{0.450}Co_{0.010}Nb_{0.010}V_{0.030}(PO_4)_{1.010}F_{0.015}$, and $Li_{1.050}Fe_{0.510}Mn_{0.450}Co_{0.0100}Nb_{0.005}V_{0.025}(PO_4)_{1.0209}$.

In certain embodiments, the lithium metal oxide is selected from the group consisting of lithium nickel cobalt aluminum oxide (NCA), lithium nickel cobalt magnesium oxide (NCMg), lithium nickel cobalt, manganese oxide (NCM), lithium nickel cobalt rare earth oxide (NCRE), spinel lithium manganese oxide (LMO), layered layered oxide cathode (LLC), lithium cobalt oxide (LCO), layered Mn oxide, and combinations thereof.

In certain embodiments, the lithium metal oxide is a lithium nickel cobalt manganese oxide (NCM).

In certain embodiments, the lithium metal oxide is a lithium nickel cobalt aluminum oxide (NCA).

In certain embodiments, the lithium metal oxide is lithium nickel cobalt manganese oxide (NCM) and the lithium iron manganese phosphate is $LiFe_{1-x}Mn_xPO_4$ wherein $0.400<x\leq0.450$.

In certain embodiments, the positive electrode active material further comprising additional lithium transition metal polyanion compounds.

In certain embodiments, the positive electrode active material comprises from about 10-90% of the lithium iron manganese phosphate compound.

In certain embodiments, the positive electrode active material comprises from about 40-70% of the lithium iron manganese phosphate compound.

In certain embodiments, the lithium iron manganese phosphate compound is in the form of particulates having a size of about 100 nm or less.

In certain embodiments, the lithium iron manganese phosphate compound is in the form of particulates having a specific surface area greater than about 5 $m^2/g$.

In certain embodiments, the lithium iron manganese phosphate compound is in the form of particulate; the lithium metal oxide is in the form of particulate; and the ratio of specific surface areas between the lithium iron manganese phosphate compound and the lithium metal oxide is between 0.5 to 500.

In certain embodiments, a lithium ion battery comprising a positive electrode comprising the positive electrode active material described herein is disclosed.

In certain embodiments, the lithium ion battery includes a graphite anode.

In certain embodiments, the LFMP has a Mn content that is less than or equal to the Fe content. For example, LFMP has a Mn content that is less than or equal to 0.500, less than 0.450, less than 0.400, less than 0.350, and the like. For example, LFMP has a Mn content that is between 0.100 and 0.500, between 0.200 and 0.500, between 0.300 and 0.500, between 0.350 and 0.500 or between 0.400 and 0.500.

In certain embodiments, the LFMP can be optionally doped with one or more transition metals. For example, the dopant metals can be doped at levels that are greater than the amount of trace metals and/or impurities, such as greater than 1 ppm, 10 ppm, 100 ppm, 1000 ppm, 10,000 ppm, and about 50,000 ppm. In certain embodiments, the dopant metals can be doped at levels that are greater than 100 ppm and less than 100,000 ppm. In certain embodiments, the dopant metals can be doped up to the level so that the dopant metals do not precipitate out of the LFMP olivinic structure to form secondary precipitates.

In certain embodiments, the lithium metal oxide includes lithium nickel cobalt, manganese oxide (NCM), lithium nickel cobalt, aluminum oxide (NCA), lithium nickel cobalt magnesium oxide (NCMg), lithium nickel cobalt rare earth oxide (NCRE), spinel lithium manganese oxide (LMO), or LLC (layered layered oxide cathode). Other non-limiting examples of lithium transition metal oxide include LCO (lithium cobalt oxide), layered Mn oxide, and other similar lithium metal oxides.

A variety of LFMP:lithium metal oxide weight ratios can be used. The LFMP:lithium metal oxide ratio can vary from 1:99 to 99:1. In some embodiments, the LFMP: lithium metal oxide weight ratio is about 1:99, 5:95, 10:90, 15:85, 20:80, 25:75, 30:70, 35:65; 40:60, 45:55, 50:50, 55:45, 60:40, 65:35, 70:30, 75:25, 80:20, 85:15, 90:10, 95:5, or 99:1.

In some embodiments, the mixed cathode material comprises at least about 10% of the doped or undoped LFMP material.

In some embodiments, the mixed cathode material comprises at least about 20% of the doped or undoped LFMP material.

In some embodiments, the mixed cathode material comprises at least about 30% of the doped or undoped LFMP material.

In some embodiments, the mixed cathode material comprises at least about 40% of the doped or undoped LFMP material.

In some embodiments, the mixed cathode material comprises at least about 50% of the doped or undoped LFMP material.

In some embodiments, the mixed cathode material comprises at least about 60% of the doped or undoped LFMP material.

In some embodiments, the mixed cathode material comprises at least about 70% of the doped or undoped LFMP material.

In some embodiments, the mixed cathode material comprises at least about 80% of the doped or undoped LFMP material.

In some embodiments, the mixed cathode material comprises between about 10-80%, 20-70%, 30-70%, 40-70%, 40-60% of the doped or undoped LFMP material.

The mixed positive electroactive material comprising LFMP and lithium metal oxide has high energy density (energy per unit volume) and capacity compared to the LFMP material alone. In some embodiments, the mixed positive electroactive material has a charge capacity of more than about 150 mAh/g, 155 mAh/g, 160 mAh/g, 165 mAh/g, 170 mAh/g, 175 mAh/g, or 180 mAh/g. In some embodiments, the mixed positive electroactive material has a specific energy (energy per unit mass) of more than about 500 mWh/g, 550 mWh/g, or 600 mWh/g. In some embodiments, the powder density using the mixed positive electroactive material disclosed herein is higher compared to the LFMP material alone due to higher material density of oxide cathode material. In some embodiments, the powder density of the mixed positive electroactive material is about 4.5-4.8 g/cc. In comparison, the powder density of lithium iron phosphate (LFP) is about 3.5-3.66 g/cc and the powder density of lithium iron manganese phosphate (LFMP) is about 3.4-3.5 g/cc.

In some embodiments, the two compounds can be mixed using conventional milling processes. In some specific embodiments, a planetary mixer is used to mix a slurry comprising LFMP and lithium metal oxide. Other ways of mixing powders known in the art are contemplated. In some specific embodiments, LFMP is subjected to wet-milling, and the resulting compounds are combined with lithium transition metal oxide such as NCM in a mixer, e.g., a planetary mixer.

In some embodiments the LFMP compound contain powder or particulates and the lithium metal oxide compounds contain powder or particulates. In certain embodiments, the ratio of the specific surface areas between LFMP and lithium metal oxide range from about 0.5 to about 500. For example, the ratio of the specific surface areas between LFMP and lithium metal oxide is about 5, 10, 50, 100, 200, 300, 400 and 500.

Lithium Iron Manganese Phosphate (LFMP)

The particular LFMP compounds that can be utilized are discussed in greater detail herein.

In some embodiments, the lithium transition metal phosphate is a doped LFMP material having at least one olivinic phase that comprises lithium (Li), iron (Fe), manganese (Mn), one or more dopants (D) and phosphate ($PO_4$), where the overall composition includes Fe+Mn+D=1.0, the ratio of the amount of Li:(Fe+Mn+D) ranges from about 1.0 to about 1.05, the ratio of the amount of $PO_4$:(Fe+Mn+D) ranges from about 1.0 to about 1.025, D is one or more metals selected from the group consisting of cobalt (Co), nickel (Ni), vanadium (V), niobium (Nb), and mixtures thereof, and Mn ranges from 0.350 to less than 0.600, from 0.400 to less than 0.600, from 0.400 to 0.550, from 0.450 to 0.550, or from 0.450 to 0.500.

Particularly, Mn is equal to or less than 0.5, from 0.350 to less than 0.500, or 0.400 to less than 0.500, or 0.425 to 0.500, or 0.475 to 0.500. In certain embodiments, D is one or more metals selected from the group consisting of cobalt (Co), vanadium (V), or mixtures thereof. In certain embodiments, the LFMP material can be further doped with fluorine (F).

In some embodiments, the composition comprises up to about 0.1 mol %, 0.5 mol %, 1 mol %, 1.5 mol %, 2 mol %, 2.5 mol %, 3 mol %, 3.5 mol %, 4 mol %, 4.5 mol %, 5 mol %, 6 mol %, 7, mol %, 8, mol %, 9 mol %, or 10 mol % of the one or more dopant metals.

In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Co.

In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Ni.

In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Nb.

In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of V.

In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Co, Ni, Nb, and/or V.

In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of F.

In one or more embodiments, lithium transition metal phosphate material is provided including a lithium and/or phosphate stoichiometric electroactive material, having one or more phases comprising lithium (Li), iron (Fe), manganese (Mn), one or more dopants (D) and phosphate ($PO_4$), where the overall composition has a ratio of Li:(Fe+Mn+D) that is 1.000, a ratio of ($PO_4$):(Fe+Mn+D) that is 1.000, and D is one or more metals selected from the group consisting of cobalt (Co), nickel (Ni), vanadium (V), niobium (Nb), or mixtures thereof. In certain embodiments, D is one or more metals selected from the group consisting of cobalt (Co), vanadium (V), or mixtures thereof. In certain embodiments, D is one or more metals selected from the group consisting of cobalt (Co), vanadium (V), niobium (Nb). or mixtures thereof. Without wishing to be bound by theory, the presence of Nb may increase the electrical conductivity of the electroactive material. In certain embodiments, the positive electrode material can be further doped with fluorine (F).

In one or more embodiments, lithium transition metal phosphate material including a lithium-rich and/or phosphate-rich electroactive material is provided. The electroactive material comprises at least an olivinic phase that includes lithium (Li), iron (Fe), manganese (Mn), one or more dopants (D) and phosphate ($PO_4$), where the overall composition has a ratio of Li:(Fe+Mn+D) ranging from about greater than 1.000 to about 1.050, a ratio of ($PO_4$):(Fe+Mn+D) ranging from about greater than 1.000 to about 1.025, and D is one or more metals selected from the group consisting of cobalt (Co), nickel (Ni), vanadium (V), niobium (Nb), and mixtures thereof. In certain embodiments, D is one or more metals selected from the group consisting of cobalt (Co), vanadium (V), or mixtures thereof. In certain embodiments, the positive electrode material can be further doped with fluorine (F).

The excess lithium and excess phosphate in the overall composition need not provide a non-stoichiometric olivine compound in a single olivinic structure or single olivinic phase. Rather, the excess lithium and/or phosphate may be present, for example, as secondary phases and the like in conjunction with an olivinic phase.

Typically, the dopants, such as Co, Ni, V, Nb, and/or F, are doped into and reside on the lattice sites of the olivinic structure to form an olivinic phase. One or more dopant may be used. In certain embodiments, the LFMP composition includes one dopant and the dopant is Co, Ni, or V. In other embodiments, the LFMP composition includes two or more dopants and the dopants include Co and Ni, or Co and V, or Co, Ni and V. However, small amounts of dopant-rich secondary phases may be tolerated before degradation of the Li-ion battery cell performance is exhibited.

In some embodiments, LFMP may be optionally further doped with a metalloid, halogen or combinations thereof. In certain embodiments, LFMP may be optionally doped at the Li, M or O-sites. Deficiencies at the Li-site may be compensated by the addition of a metal or metalloid, and deficiencies at the O-site may be compensated by the addition of a halogen. In other instances, deficiencies are manifest as vacancies in the lattice.

In other embodiments, each of the above described dopant combinations may further include one or more of Ti, Zr, Nb, Al, Ta, W or Mg. In some embodiments, the Li-sites of the LFMP may be doped with a non-alkali metal dopant such as one or more of Ti, Zr, Nb, Al, Ta, W or Mg, at an atomic composition that ranges from 0.0002 to 0.1 or from 0.005 to 0.05.

In other embodiments, there may be some substitution of Li onto the Fe and/or Mn site. In one embodiment, there is about 5 or 10% substitution of Li onto the Fe and/or Mn-sites.

In certain embodiment, LFMP can crystallize in the ordered-olivine or triphylite structure, or a structure related to the ordered olivine or triphylite structure with small displacements of atoms without substantial changes in the coordination number of anions around cations, or cations around anions.

In some embodiments, vacancies can occupy either the Fe or Mn sites of the LFMP.

In some cases, the lithium transition metal phosphate composition has an olivine structure and contains in crystalline solid solution, simultaneously the metal ions $Fe^{2+}$ and $Fe^{3+}$, $Mn^{2+}$ and $Mn^{3+}$, $Co^{2+}$ and $Co^{3+}$, $Ni^{2+}$ and $Ni^{3+}$, $V^{2+}$ and $V^{3+}$, or $Cr^{2+}$ and $Cr^{3+}$, with the ion of lesser concentration being at least 10 parts per million of the sum of the two ion concentrations.

Some suitable exemplary lithium transition metal phosphate material that may provide improved energy density and power density include, but are not limited to:

$Li_{1.025}Mn_{0.400}Fe_{0.580}Co_{0.020}(PO_4)_{1.000}$ $Li_{1.025}Mn_{0.450}Fe_{0.530}Co_{0.020}(PO_4)_{1.000}$ $Li_{1.025}Mn_{0.500}Fe_{0.480}Co_{0.010}Ni_{0.010}(PO_4)_{1.000}$ $Li_{1.050}Mn_{0.450}Fe_{0.500}Co_{0.010}Ni_{0.010}V_{0.030}(PO_4)_{1.025}$ $Li_{1.040}Mn_{0.400}Fe_{0.560}Co_{0.010}Ni_{0.010}V_{0.020}(PO_4)_{1.015}$ $Li_{1.040}Mn_{0.450}Fe_{0.510}Co_{0.010}Ni_{0.010}V_{0.020}(PO_4)_{1.015}$ $Li_{1.030}Mn_{0.450}Fe_{0.520}Co_{0.010}Ni_{0.010}V_{0.010}(PO_4)_{1.005}$ $Li_{1.040}Mn_{0.450}Fe_{0.510}Co_{0.010}Ni_{0.010}V_{0.030}(PO_4)_{1.010}F_{0.015}$ $Li_{1.050}Mn_{0.450}Fe_{0.510}Co_{0.0100}Ni_{0.005}V_{0.020}(PO_4)_{1.020}$ $Li_{1.000}Mn_{0.500}Fe_{0.460}Co_{0.040}PO_4$ $Li_{1.000}Mn_{0.450}Fe_{0.530}Co_{0.010}Ni_{0.010}PO_4$ $Li_{1.025}Mn_{0.500}Fe_{0.480}Co_{0.010}Nb_{0.010}(PO_4)_{1.000}$ $Li_{1.050}Mn_{0.450}Fe_{0.500}Co_{0.010}Nb_{0.010}V_{0.030}(PO_4)_{1.025}$ $Li_{1.040}Mn_{0.400}Fe_{0.560}Co_{0.010}Nb_{0.010}V_{0.020}(PO_4)_{1.015}$ $Li_{1.040}Mn_{0.450}Fe_{0.510}Co_{0.010}Nb_{0.010}V_{0.020}(PO_4)_{1.015}$ $Li_{1.030}Mn_{0.450}Fe_{0.520}Co_{0.010}Nb_{0.010}V_{0.010}(PO_4)_{1.005}$ $Li_{1.040}Mn_{0.450}Fe_{0.510}Co_{0.010}Nb_{0.010}V_{0.030}(PO_4)_{1.010}F_{0.015}$, or $Li_{1.050}Mn_{0.450}Fe_{0.510}Co_{0.0100}Nb_{0.005}V_{0.020}(PO_4)_{1.020}$.

Moreover, without wishing to be bound by theory, most dopant metals have stable oxidation states that may be changed only at potentials that are significantly different from the redox potentials of Fe and/or Mn. Therefore, these dopant metals are not expected to directly contribute to the electric storage capacity of the material. For example, since the redox potentials of Co and Ni are about at least 0.5V higher than that of manganese and at least 1.0V higher than that of iron, such dopant metals would not normally contribute significant electric storage capacity to a battery cell operating at or near the redox plateau for $Fe^{2+} \rightarrow Fe^{3+}$.

In certain embodiments, the lithium transition metal phosphate including a doped olivine electroactive compound can be prepared from starting materials of lithium salts, iron compounds and phosphorous salts including, but not limited to, lithium carbonate, iron oxalate or carbonate, manganese carbonate, and ammonium phosphate to which a low additional concentration of dopant metal such as Co, Ni, V, and/or F have been added, such as using cobalt oxalate, nickel oxalate, vanadium oxide, and/or ammonia fluoride. In other embodiments, lithium transition metal phosphate is prepared from a lithium source, e.g., a lithium salt, and a transition meal phosphate. Additional dopant metal(s) can be added as well. The dried powder mixture is heated under a low oxygen, e.g., inert, environment at a temperature of 300° C. to 900° C., and for example at a temperature of about 600-700° C. Further details regarding the composition and preparation of these compounds are found in U.S. Pat. Nos. 7,338,734, 8,187,735, and U.S. Patent Publication No. 2009/0186277, all of which are incorporated by reference herein in their entirety.

Additionally, control of the primary olivine crystallite size to <100 nm dimensions may be beneficial in enhancing both lithium transport kinetics and conductivity of the LFMP materials. Further details regarding the composition and preparation of such analogous compounds (lithium-iron phosphate materials) are found in U.S. Pat. No. 7,338,734, which is incorporated herein in its entirety by reference.

Doping with hypervalent transition metals such as Nb or V may further contribute to the advantageous application of the resulting olivine materials for rechargeable lithium ion battery applications. The advantageous role of the dopant may be several fold and include the increased electronic conductivity of the olivine powder and may limit the sintering of the olivine nanophosphate particles to allow full utilization of the lithium capacity during fast charge/discharge of the battery.

In some embodiments, additional lithium transition metal polyanion compounds may be included. Non-limiting examples of additional lithium transition metal polyanion compounds that can be used in conjunction with the LFMP and lithium metal oxide described herein include $LiCoPO_4$, $LiMnPO_4$, $Li_3V_2(PO_4)_3$, $LiVPO_4F$ and mixed transition metal phosphate.

In some embodiments, at least some of the dopants may be in solid solution in the crystal structure of the LFMP compound. In certain embodiments, at least some of the dopants may be in solid solution in the crystal structure of the LFMP compound, while some also appear as an additional phase. For example, some of the dopants may at least be in solid solution in the crystal structure of the LFMP compound at a concentration of at least 0.01 mol % relative to the concentration of Fe+Mn, at least 0.02 mol % relative to the concentration of Fe+Mn, at least 0.05 mol % relative to the concentration of Mn+Fe, or at a concentration of at least 0.1 mol % relative to the concentration of Fe+Mn, the balance appearing as an additional phase.

In some embodiments, the conductivity of the LFMP compound has a conductivity at least about $10^{-8}$ S/cm, at least about $10^{-5}$ S/cm, at least about $10^{-4}$ S/cm, and, in some cases, at least about $10^{-2}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, in some cases, at least about $10^{-3}$ S/cm, and in other cases, at least about 10-2/cm.

In some embodiments, the LFMP has a gravimetric capacity of at least about 120 mAh/g while the device is charging/discharging. However, in some embodiments, the capacity is at least about 130 mAh/g, or in other embodiments, at least about 140 mAh/g, in some embodiments, at least about 150 mAh/g, and in still other embodiments, at least about 160 mAh/g. The present invention can, in some embodiments, also provide a capacity up to the theoretical gravimetric capacity of the compound.

LFMP can be prepared with a markedly smaller particle size and much larger specific surface area than previously known positive active materials, such as $LiCoO_2$, $LiNiO_2$ or $LiMn_2O_4$ and, thus improved transport properties. Improved transport properties reduce impedance and may contribute to low impedance growth. In some embodiments the lithium transition-metal phosphate compounds consists of powder or particulates with a specific surface area of greater than about 5 $m^2/g$, greater than about 10 $m^2/g$, greater than about 15 $m^2/g$, greater than about 20 $m^2/g$, greater than about 30 $m^2/g$, greater than about 35 $m^2/g$, greater than about 40 $m^2/g$, or greater than about 50 $m^2/g$.

LFMP having the olivine structure and made in the form of very small, high specific surface area particles may be exceptionally stable in delithiated form even at elevated temperatures and in the presence of oxidizable organic solvents, e.g., electrolytes, thus enabling a safer Li-ion battery having a very high charge and discharge rate capability. In addition, the small-particle-size, high specific-surface-area $LiFePO_4$-based material exhibits not only high thermal stability, low reactivity and high charge and discharge rate capability, but it also exhibits excellent retention of its lithium intercalation and deintercalation capacity during many hundreds, or even thousands, of high-rate cycles.

In certain embodiments, it has been unexpectedly discovered that these ion storage materials having sufficiently small size scale and correspondingly high surface to volume ratio or specific surface area provide fundamentally different physical properties compared to their conventional coarse-grained counterparts. Despite having gross structural similarities such as crystal structure type and basic atomic arrangements, the nanoscale materials are compositionally and structurally distinct from, and provide different and improved electrochemical utility and performance compared to the coarse-grained materials. The difference in relevant physical properties arises because the nanoscale materials are sufficiently small in at least one dimension (for instance, the diameter of an equi-axed particle, the diameter of a nanorod, or the thickness of a thin film) that they have different defect and thermodynamic properties. These nanoscale ion storage materials exhibit outstanding electrochemical performance for use in primary or secondary storage batteries, in particular providing a very high rate capability, while providing a large fraction of the intrinsic charge capacity and energy density of the material.

In some instances, LFMP includes approximately equi-axed particles having an "equivalent spherical particle size" (number-averaged mean particle diameter that would result in the measured surface area if the material were in the form of identically-sized spherical particles) of about 100 nm or less, for example, about 75 nm or less, about 70 nm or less, about 60 nm or less, about 50 nm or less, about 45 nm or less, about 40 nm or less, or about 35 nm or less. In certain embodiments, the material includes anisometric particles or a thin film or coating having a smallest cross-sectional dimension that is, on a number-averaged basis to provide a mean value, about 100 nm or less, for example, about 75 nm or less, about 70 nm or less, about 60 nm or less, about 50 nm or less, about 45 nm or less, about 40 nm or less, or about 35 nm or less. These dimensions can be measured using various methods, including direct measurement with an electron microscope of the transmission or secondary-electron type, or with atomic force microscopy. Such nanoscale ion storage materials are described in more detail as U.S. Pat. No. 7,338,734, supra.

In certain embodiments, the LFMP described herein are prepared from conventional materials by size-reduction processes (e.g., milling) to reduce the particle dimensions into the desired range. However, this can be a highly energy-intensive process. Thus, the materials also can be synthesized in the nanoscale state, by methods including, but not limited to, solid-state reactions between metal salts, wet-chemical methods, such as co-precipitation, spray-pyrolysis, mechanochemical reactions, or combinations thereof. Nanoscale materials with the desired particle sizes and specific surface areas are obtained by using homogeneous reactants, minimizing the reaction or crystallization temperature (in order to avoid particle coarsening), and avoiding formation of liquid phases in which the product is highly soluble (which also tends to lead to particle coarsening). Specific processing conditions can typically be established for a given process without undue experimentation by those skilled in the art. Further details regarding the composition and preparation of these compounds are found in U.S. patent application Ser. No. 11/396,515, supra, now issued as U.S. Pat. No. 7,939,201.

In some embodiments, nanoscale LFMP materials are prepared by non-equilibrium, moderate temperature techniques, such as wet-chemical or low temperature solid-state reactions or thermochemical methods. The materials thus prepared can acquire properties such as increased nonstoichiometry and disorder and increased solubility for dopants because they are synthesized in a metastable state or because kinetic pathways to the final product differ from those in conventional high temperature processes. Such disorder in the nanoscale form can also be preserved substantially under electrochemical use conditions and provide benefits as described herein.

Lithium Transition Metal Oxide Compound

In some embodiments, lithium metal oxide for the mixed positive electroactive material is lithium nickel cobalt aluminum oxide (NCA), lithium nickel cobal magnesium oxide (NCMg), lithium nickel cobalt, manganese oxide (NCM), lithium nickel cobalt, rare earth oxide (NCRE), spinel lithium manganese oxide (LMO), or layered layered oxide cathode (LLC). Other non-limiting examples of lithium transition metal oxide include LCO (lithium cobalt oxide), and layered Mn oxide and the like can also be used in the mixture of the positive electroactive material as disclosed herein. In certain embodiments, metal oxides may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

Some exemplary, suitable NCM materials include $Li_{1\pm\delta}Ni_pCo_qMn_{(1-p-q)}O_2$, where $0<\delta<0.1$, $p\geq0.3$, and $q\leq0.5$. For example, in certain embodiments, a typical NCM may include $\delta=0$, $p=\frac{1}{3}$, and $q=\frac{1}{3}$. In some other embodiments, $\delta=0$, $p=0.4$, and $q=0.4$. In some other embodiments, $\delta6=0$, $p=0.5$, and $q=0.2$. In some other embodiments, $\delta6=0$, $p=0.6$, and $q=0.2$. In some other embodiments, $\delta=0$, $p=0.7$, and $q=0.2$. In some other embodiments, $\delta=0$, $p=0.9$, and $q=0.05$. In certain embodiments, NCM materials may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

Some exemplary, suitable NCA materials include $Li_{1\pm\delta}Ni_pCo_qAl_{(1-p-q)}O_2$, where $0<\delta<0.1$, and $1-p-q\leq0.05$. In certain embodiments, $p\geq0.3$ and $q\leq0.5$. For example, in certain embodiments, a typical NCA materials may include $\delta=0$, $p=0.9$, and $q=0.05$. In certain embodiments, NCA may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

Some exemplary, suitable NCMg materials include $Li_{1\pm\delta}Ni_pCo_qMg_{(1-p-q)}O_2$, where $0<\delta<0.1$, $1-p-q\leq0.05$, $p>0.8$ and $0.05<q<0.2$. In certain embodiments, $p\geq0.3$ and $q\leq0.5$. For example, in certain embodiments, a typical NCMg may include $\delta=0$, $p=0.9$, and $q=0.05$. In certain embodiments, NCMg materials may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

Some exemplary, suitable NCRE materials include $Li_{1\pm\delta}Ni_pCo_qRE_{(1-p-q)}O_2$, where $0<\delta<0.1$, $1-p-q\leq0.05$, $p>0.8$, $0.05<q<0.2$ and RE is a rare earth metal selected from the group consisting of Sc, Y, La, Ce, Pr, Nd, Pm, Sm, Eu, Gd, Tb, Dy, Ho, Er, Tm, Yb and Lu. In certain embodiments, $p\geq0.3$ and $q\leq0.5$. For example, in certain embodiments, a typical NCA may include $\delta=0$, $p=0.9$, and $q=0.05$. In certain embodiments, NCRE materials may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

Some exemplary, suitable LMO materials include $LiMe'_rMn_{2-r}O_4$ where Me' may be Cr, Co, Fe, Ni, Cu and the like, and $0\leq r<2$ (e.g., $r=0.5$), such as $LiNi_{0.5-s}Fe_yMn_{1.5}O_4$. For example, some suitable LMO materials are described in Alcantara et al., "Synergistic Effects of Double Substitution in $LiNi_{0.5-s}Fe_yMn_{1.5}O_4$ Spinel as 5 V Cathode Materials," *Journal of the Electrochemical Society*, 152 (1) A13-A18 (2005), the contents of which is incorporated by reference herein in its entirety. In certain embodiments, LMO materials may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

Some exemplary, suitable LLC materials include t $LiMO_2 \cdot (1-t)Li_2M'O_3$, $u\{t\ LiMO_2 \cdot (1-t)Li_2M'O_3\} \cdot (1-u)LiM''_2O_4$, $u\{t\ LiMO_2 \cdot (1-t)Li_2M'O_3\} \cdot (1-u)M''O$, where M may be selected from Ti, V, Cr, Fe, Mn, Co, Ni, Cu or combinations thereof, M' may be selected from Ti, Mn, Zr, Ru, Sn, or combinations thereof, M'' is typically Mn, Ni, Co or combinations thereof. For example, some suitable LLC materials are described in U.S. Pat. No. 7,358,009, the contents of which are incorporated by reference herein in its entirety. In certain embodiments, LLC materials may be coated with other oxides, hydroxides, oxyhydroxide, phosphates, or fluorides of metal compounds based on Mg, Al, Co, K, Na, Ca, Si, Ti, V, Ge, Ga, B, Zn, As, Zr, and the like, such as alumina, magnesia, zirconia, zinc oxide, $AlF_3$, and the like.

In some embodiments, the lithium transition metal oxides disclosed in U.S. Pat. No. 7,041,239 (the content of which is hereby incorporated by reference herein in its entirety) are used in the mixture of the positive electroactive material as disclosed herein. In some embodiments, the oxygen atom in lithium transition metal oxide is substituted by an another atom such as F, Cl, or Br.

In other embodiments, lithium metal oxide materials having a smaller specific surface areas, as compared to the LFMP described above, can be used for the mixed positive electroactive material. In some specific embodiments, the lithium metal oxide has a BET (Brunauer-Emmett-Teller method) specific surface area of less than about 10 m$^2$/g, less than about 5 m$^2$/g, less than about 2 m$^2$/g, less than about 1 m$^2$/g, less than about 0.5 m$^2$/g, less than about 0.1 m$^2$/g, and the like. In certain embodiments, the lithium metal oxide has a BET specific surface area between 0.5 m$^2$/g to 2 m$^2$/g, or between 0.5 m$^2$/g to 1 m$^2$/g, and the like.

Assembly of Electrode and Battery

On an electrode level, the active material and a conductive additive are combined to provide an electrode layer that permits rapid lithium diffusion throughout the layer. A conductive additive such as carbon or a metallic phase is included in order to improve its electrochemical stability, reversible storage capacity, or rate capability. Exemplary conductive additives include graphite, carbon black, acetylene black, vapor grown fiber carbon ("VGCF") and fullerenic carbon nanotubes. Conductive diluents are present in a range of about 1%-5% by weight of the total solid composition of the positive electrode.

The positive electrode (cathode) is manufactured by applying a semi-liquid paste containing the mix cathode active material and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. Exemplary adhesion layers include, without limitation, those described in U.S. Patent Publication No. 2010/0075225, entitled "Nanocomposite Electrodes and Related Devices," filed Sep. 5, 2006, which is incorporated herein in its entirety by reference. The dried layers are calendared to provide layers of uniform thickness and density. The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

A positive electrode can have a thickness of less than 125 µm, e.g., 15 µm to 40 µm, 30 µm to 70 µm, 100 µm to 130 µm on each between about 50 µm to 125 µm, or between about 80 µm to 100 µm on each side of the current collector, and a pore volume fraction between about 10 and 90 vol % or 40 and 70 vol %. The active material is typically loaded at about 10-20 mg/cm$^2$, and typically about 11-15 mg/cm$^2$. Other numerical ranges of thickness and material loadings are contemplated. In general, a thicker electrode layer (and higher active material loading) provides greater total capacity for the battery. However, thicker layers also increase the electrode impedance. The present inventors have surprisingly discovered that high capacity, thick layers may be used in a low impedance (high rate) cell. Use of a high specific surface area active material, while maintaining adequate pore volume, provides the desired capacity without increasing impedance to unacceptably high levels.

The selection criteria for an anode are at two levels, the particle level and the electrode level. At the particle level, the particle size and the Li diffusion coefficient of the particle are selection criteria. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used. The carbonaceous material has a numerical particle size (measured by a laser scattering method) that is smaller than about 25 µm, or smaller than about 15 µm, or smaller than about 10 µm, or even less than or equal to about 6 µm. The smaller particle size reduces lithium diffusion distances and increases rate capability of the anode, which is a factor in preventing lithium plating at the anode. In those instances where the particle is not spherical, the length scale parallel to the direction of lithium diffusion is the figure of merit. Larger particle sized materials may be used if the lithium diffusion coefficient is high. The diffusion coefficient of MCMB is ~10$^{-10}$ cm$^2$/s. Artificial graphite has a diffusion coefficient of ~10$^{-8}$ cm$^2$/s. As a result larger particle size artificial graphite could be used, approximately equal to 15 microns times the square root of the ratio of the respective diffusivities (H. Yang et al., *Journal of Electrochemical Society*, 151 (8) A1247-A1250 (2004)).

In some embodiments, the anode materials include high capacity silicon tin alloy, other metal compound anode, lithium metal and lithium metal alloy, and lithium titanium oxide (LTO). In other embodiments, anode materials include high capacity of Silicon alloy, tin alloy, SiO nano compound, and other metal compound for higher capacity. Other suitable anode materials known in the art are contemplated.

In one or more embodiments, the anode is an alloy or compound of lithium with another metal or metalloid including Al, Si, Sn, Sb, B, Ag, Bi, Cd, Ga, Ge, In, Pb, or Zn. Other anode materials include those disclosed in U.S. Patent Publication No. 2006/0292444, the content of which is hereby incorporated by reference herein in its entirety.

In some embodiments, the negative active material consists of powder or particulates with a specific surface area measured using the nitrogen adsorption Brunauer-Emmett-Teller (BET) method to be greater than about 0.1 m$^2$/g, 0.5 m$^2$/g, 1.0 m$^2$/g, 1.5 m$^2$/g, 2 m$^2$/g, 4 m$^2$/g, 6 m$^2$/g, 8 m$^2$/g, 10 m$^2$/g, 12 m$^2$/g, 14 m$^2$/g, or 16 m$^2$/g. Other specific surface areas for the negative active material are contemplated.

On an electrode level, the active material and a conductive additive are combined to provide an electrode layer that permits rapid lithium diffusion throughout the layer. A conductive additive such as carbon or a metallic phase may also be included in the negative electrode. Exemplary conductive additives include graphite, carbon black, acetylene black, vapor grown fiber carbon ("VGCF") and fullerenic carbon nanotubes. Conductive diluents are present in a range of about 0%-5% by weight of the total solid composition of the negative electrode.

The negative electrode (anode) of the battery is manufactured by preparing a paste containing the negative active material, such as graphitic or non-graphitic carbon, and a conductive carbon additive homogeneously suspended in a solution of a polymer binder in a suitable casting solvent. The paste is applied as a uniform-thickness layer to a current collector and the casting solvent is removed by drying. A metallic substrate such as copper foil or grid is used as the negative current collector. To improve the adhesion of the active material to the collector, an adhesion promoter, e.g., oxalic acid, may be added to the slurry before casting. The binder used in the negative electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

At the electrode level, the negative electrode can have a thickness of less than about 200 µm, about 150 µm, about 100 µm, about 90 µm, or about 75 µm, e.g., between about 10 µm to about 30 µm, or between about 30 µm to about 60 µm, or between about 60 µm to about 80 µm on each side of the current collector, and a pore volume fraction between about 20 and about 40 vol %. The active material is typically loaded at about 1-20 mg/cm$^2$, or about 4-5 mg/cm$^2$. In general, a thicker electrode layer (and higher active material loading) provides greater total capacity for the battery. However, thicker layers also increase the electrode impedance by reducing the ease of lithium diffusion into the anode. The present inventors have surprisingly discovered that high capacity, thick layers may be used in a low impedance cell through selection of active materials as indicated above and maintaining adequate pore volume.

A nonaqueous electrolyte is used and includes an appropriate lithium salt. Non-limiting examples of the salts include $LiPF_6$, $LiBF_4$, $LiAsF_6$, or lithium bis(trifluoromethylsulfonimide) (LiTFMSI), lithium bis(oxalatoborate) (LiBOB), or lithium bis(pentafluoroethylsulfonyl)imide (LiBETI) dissolved in a nonaqueous solvent. Other suitable salts known in the art are contemplated. One or more functional additives, such as, for example, $CO_2$, vinylene carbonate, ethylene sulfite, ethylene thiocarbonate, dimethyl dicarbonate, spirodicarbonate and propane sultone, can be included to modify the solid-electrolyte interface/interphase (SEI) that forms on the electrodes, particularly negative carbon electrodes. The electrolyte may be infused into a porous separator that spaces apart the positive and negative electrodes. In one or more embodiments, a microporous electronically insulating separator is used.

Numerous organic solvents have been proposed as the components of Li-ion battery electrolytes, notably a family of cyclic carbonate esters such as ethylene carbonate (EC), Fluoroethylene Carbonate (FEC), propylene carbonate (PC), butylene carbonate (BC), and vinylene carbonate (VC), and their chlorinated or fluorinated derivatives, and a family of acyclic dialkyl carbonate esters, such as dimethyl carbonate (DMC), diethyl carbonate (DEC), ethylmethyl carbonate (EMC), dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include methyl acetate (MA), ethyl acetate (EA), methyl formate (MF), propyl acetate (PA), methyl butyrate (MB), ethyl butyrate (EB), γ-butyrolactone (γ-BL), dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures. Other solvents suitable for use as electrolytes known in the art are contemplated.

A solid or gel electrolyte may also be employed. The electrolyte may be an inorganic solid electrolyte, e.g., LiN or LiI, or a high molecular weight solid electrolyte, such as a gel, provided that the materials exhibits lithium conductivity. Exemplary high molecular weight compounds include poly(ethylene oxide), poly(methacrylate) ester based compounds, or an acrylate-based polymer, and the like.

As the lithium salt, at least one compound from among $LiClO_4$, $LiPF_6$, $LiBF_4$, $LiSO_3CF_3$, $LiN(SO_2CF_3)_2$, $LiN(SO_2CF_2CF_3)_2$ $LiAsF_6$, lithium bis(trifluoromethylsulfonimide) (LiTFMSI), lithium bis(oxalatoborate) (LiBOB), lithium bis(pentafluoroethylsulfonyl)imide (LiBETI) and the like are used. In some embodiments, the lithium salt is at a concentration from about 0.5 to about 1.5M, for example, in certain embodiments from about 1.0 to about 1.3M.

In certain embodiments, the above described positive electrode is brought into intimate contact with the negative electrode through the separator layers, which are then spirally wound a number of times around a small-diameter mandrel to form the jelly-roll electrode-separator assembly. Next, the jelly-roll structure is inserted into a battery can, for example, made of nickel-plated steel or aluminum, current collector tabs are spot-welded to the battery can and can header, which is preferably equipped with a variety of safety features, such as positive-temperature coefficient elements, pressure burst disks, etc. Alternatively, uncoated regions can be created along the edge of the electrode, thereby exposing bare metal foil. One or preferably more metal foil strips or tabs, between about 0.4 cm and about 0.8 cm wide, can be attached to these bare regions using an ultrasonic welder. These tabs can then be attached to the can or header using an ultrasonic or spot (resistance) welder. The nonaqueous electrolyte, for example, including a solution of a lithium salt in a mixture of carbonate esters, is injected into the battery can, the can header is sealed to the battery can using a crimp seal or laser weld. An alternative cell design is described in U.S. Pat. No. 7,927,732, filed on Sep. 5, 2006, entitled "Battery Cell Design and Method of Its Construction," which is incorporated in its entirety by reference herein. Other non-limiting examples of cell types include pouch sealing type prismatic and Aluminum can or the other metal can type prismatic cells. In some specific embodiments, the cell is a pouch material sealing type of pouch cells.

According to one or more embodiments, a Li-ion battery contains a blend of optionally doped LFMP: lithium metal oxide positive electrode, a highly microporous electronically insulating separator layer, a graphitized-carbon negative electrode, and a multicomponent liquid organic electrolyte solution in which a lithium salt is dissolved at a concentration from about 0.5 to about 1.5M. Both the positive and negative electrodes have high surface area and high pore volume. In order to reduce the chance of lithium plating at the anode, the lithium capacity of the negative electrode is higher than that of the positive electrode.

In other embodiments, a process for the synthesis of a lithium electroactive metal phosphate includes a water-based milling process, wherein starting materials, such as lithium carbonate, hydrated iron phosphate, hydrated manganese phosphate, lithium dihydrogen phosphate, hydrated cobalt oxalate, hydrated nickel oxalate, and ammonium metavanadate are mixed with water soluble vinyl based copolymers or sugar precurors for milling and subsequent drying. After drying, the power can be heated under desired temperature ramp-up conditions up to about 700° C., followed by cooling to room temperature. In certain embodiments, the water-based milling process can utilize sugar and sugar/citric-acid formulations.

The positive electrode (cathode) is manufactured by applying a semi-liquid paste containing the cathode active compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. The dried layers are calendared to provide layers of uniform thickness and density. The binder used in the electrode may be any suitable binder used as binders for non-aqueous electrolyte cells.

The positive electrode active material can be incorporated into any battery shape. In fact, various different shapes and sizes, such as cylindrical (jelly roll), square, rectangular (prismatic) coin, button or the like may be used.

EXAMPLES

Example 1

Producing Mixed Positive Electroactive Material

Lithium iron manganese phosphate (LFMP), having a composition $Li_{1.06}Fe_{0.52}Mn_{0.45}V_{0.03}(PO_4)_{1.025}$, as described in United States Patent Publication No. 2011/0052988, the relevant contents of which is incorporated by reference herein in its entirety, were mixed together with NCM.

Lithium iron phosphate (LFP) material as described in U.S. Pat. No. 7,338,734, the relevant contents which are incorporated by reference herein in its entirety, were mixed together with NCM.

Graphite based anode was prepared and polyolefin type separator or ceramic-coated separator can be used to assemble the cell.

Electrode Preparation:

Electrodes were prepared by combining active materials, conductive carbon powders polymer binder and solvent then mixing them at higher shear. Additional solvent was then added to lower the viscosity and create a slurry. This slurry was then cast onto a thin piece of Aluminum foil and dried in an oven for a half-hour. After drying, the electrodes were calendered in a jeweler's press to densify the coating.

Assembly:

Electrodes were cut using a circular punch and then weighed. A cleaned piece of foil was also punched and weighed. The weight of the cleaned foil was subtracted from the electrode weights to obtain accurate coat weights, which were multiplied by the active fraction of the electrode to determine the active weight of each electrode. The cut electrodes were then dried overnight under vacuum and brought directly into a low $O_2$, low $H_2O$ Argon-filled glovebox for assembly. In the glovebox, disks were cut from lithium foil and placed with a glass-fiber disk, electrolyte, and the electrode into 2025 coin cell hardware and crimped closed.

Half cells were then tested electrochemically, using a programmable galvanostat, with the following conditions:

| Step | Type | Rate | Cutoff |
|---|---|---|---|
| 1 | Charge - constant current, voltage | C/5 | 4.3 V, C/50 |
| 2 | Discharge - constant current | C/5 CC | 2.0 V |
| 3 | Rest | — | 5 min |
| 4 | Charge - constant current, voltage | C/5 | 4.3 V, C/50 |
| 5 | Discharge - constant current | C/5 CC | 2.0 V |

Half-cells were assembled with LFMP, NCM, and LFMP:NCM (50:50). These cells were cycled 3 times at a C-rate of C/10 from 2.0V-4.3V, and removed from the battery charger fully charged at 4.3V. The cells were disassembled in an Argon atmosphere glovebox. The electrodes were quickly removed and placed coating-side down inside a high-pressure DSC crucible and sealed. These crucibles were tested in the differential scanning calorimeter (DSC) from 25° C. to 350° C. at a rate of 5° C./min.

DSC spectrum protocol: 10 minute rest, followed by 3 cycles (C/10 charge to 4.3V, CV hold at 4.3V to C/50, 10 minute rest, C/10 discharge to 2.0V, 10 minute rest), followed by C/10 charge to 4.3V, CV hold at 4.3V to C/50, followed by 5 hour rest. For CC charge and CC discharge, data was recorded every 10 minute or every 0.05V (voltage difference) (Maximum step time allowed for CC charge=20 hr). For CV hold, data was recorded every 10 minutes or every C/25 (current difference) (Maximum step time allowed for CV hold=5 hour). The 10 minute rest data was recorded every 2 minute or every 0.05V. For 5 hour rest, data was recorded every 10 minutes or every 0.05V. Final capacity in (mAh/g) was calculated using the last charge capacity divided by the sample's active area mass.

The mixed positive electroactive materials exhibited high energy density and better abuse tolerance performances. Higher energy density was obtained with better cell safety (see Tables 1 and 2). Blend cathode of oxide NCM active material shows higher energy than 100% LFMP or 100% LFP cathode cells. Moreover, both the LFP:NCM and LFMP:NCM have similar final capacity (170 mAh/g and 168 mAh/g) despite the fact that 100% LFP has a final capacity that is higher than 100% LFMP (140 mAh/g vs. 152 mAh/g).

TABLE 1

Capacity and efficiency of M1 ($LiFePO_4$ Nanophosphate ®) blends with NCM (oxide cathode).

| Cathode | FCC (mAh/g) | Reversible (mAh/g) | Efficiency |
|---|---|---|---|
| LFP 100% | 152 | 150 | 0.984 |
| LFP 50%, NCM 50% | 170 | 155 | 0.901 |
| NCM 100% | 186 | 162 | 0.868 |

TABLE 2

Capacity and efficiency of LFMP ($Li_{1.06}Fe_{0.52}Mn_{0.45}V_{0.03}(PO_4)_{1.025}$ Nanophosphate ®) blends with NCM (oxide cathode).

| Cathode | FCC (mAh/g) | Reversible (mAh/g) | Efficiency |
|---|---|---|---|
| LFMP | 140 | 136 | 0.974 |
| LFMP 50%, NCM 50% | 168 | 156 | 0.930 |
| NCM 100% | 186 | 162 | 0.868 |

As shown by the DSC data, (FIG. 1), 100% LFMP cathode does not show the exothermic peak around 260° C.

Figure 1:
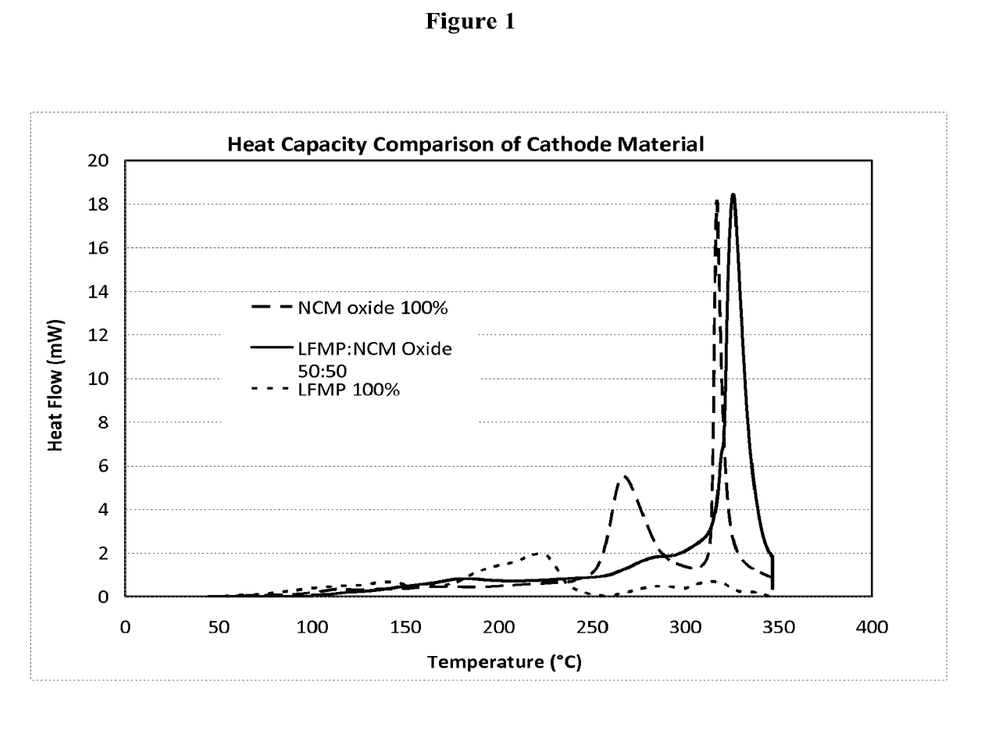
FIG. 1 is a plot of DSC chart of $LiFe_{0.5}Mn_{0.5}PO_4$ NANOPHOSPHATE blends with lithium nickel cobalt, manganese oxide (NCM).

Surprisingly, 50% blended NCM cathode also does not show this peak even though 100% NCM clearly show this peak around 260° C. This indicates an improved safety of the cell, as the temperature for initiation of exothermic events is raised to nearly 320° C. Other cell shut down mechanisms may trigger before this critical temperature is reached and prevent temperature runaway from occurring.

Figure 2:
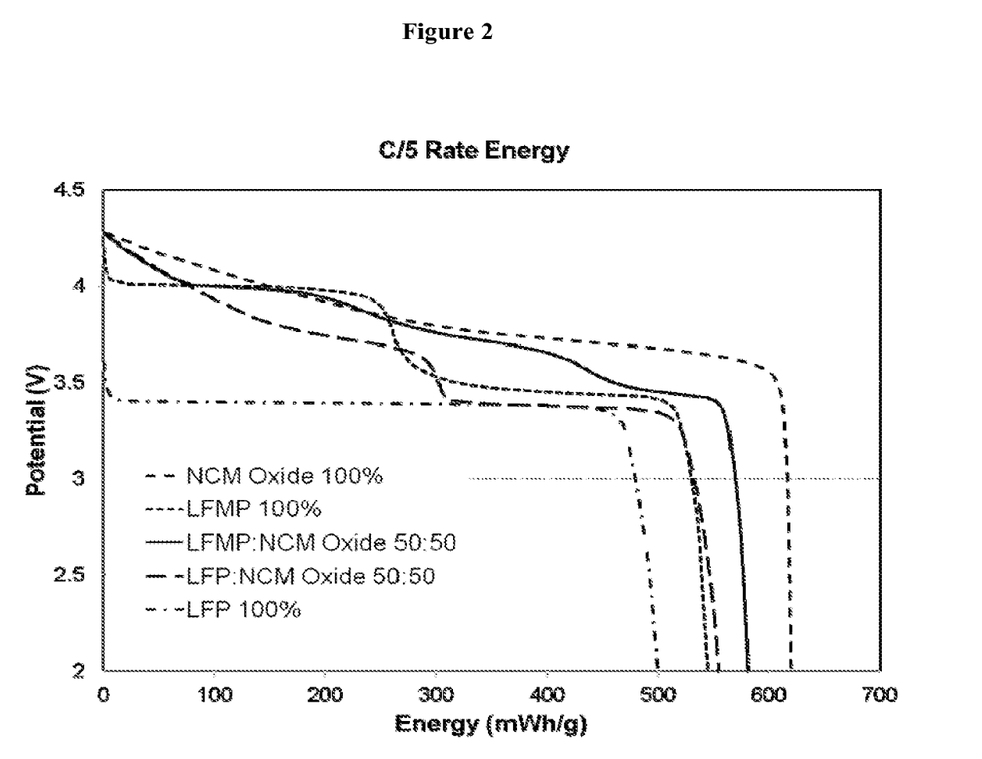
FIG. 2 is a plot of specific energy of LFP ($LiFePO_4$ Nanophosphate®) (dot/dash), $LiFe_{0.5}Mn_{0.5}PO_4$ (LFMP) (short dash), lithium-nickel-cobalt-manganese-oxide (NCM) (medium dash), LFMP:NCM (50:50) blend (solid line) and LFP:NCM (50:50) blend.

Additionally, as shown in FIG. 2, there was a smooth discharge voltage profile when using LFMP:NCM blend material in the mixed positive electrode material. In comparison, LFP:NCM blend has a bump in the voltage profile.

As shown, the efficiency can be improved by blending LFMP with NCM materials.

Example 2

Producing Full Cells (Prismatic Pouch)

Electrode Fabrication:

Electrodes were prepared by combining active materials, conductive carbon powders polymer binder and solvent then mixing them at higher shear to make a slurry. This slurry was then pumped into a slot die of an industrial coater, which feeds a roll of Al foil past the die, picking up the slurry, and pulls it through a heating zone, winding the coated foil on the other end. This coated foil was then passed through the coater again to coat the opposite side. Then the electrode roll was densified by calendering.

Rectangular pieces of electrode were stamped using a special die-cutter leaving a narrow stem at the top, which was then cleared of any coating. LFMP/NCM cathode electrodes and Graphite anode electrodes were both prepared this same way.

Assembly:

The electrodes were then stacked, alternating anode, polyolefin separator, cathode. Once the stack was prepared, extension tabs were welded to the cleaned stems at the ends of each respective electrode set. These electrode sub-assemblies were then place inside a polymer-coated pouch with electrolyte, and a vacuum sealed.

Advantages

Anodes, such as graphite anodes, generally have an efficiency of about 91 to 94%. As the cell capacity is defined as the total first charge capacity of the cathode minus the maximum of irreversible capacity of the total cathode or anode, higher cathode efficiency is desirable. As shown, the efficiency can be improved by blending LFMP with NCM materials.

As discussed above, particular superior results are obtained when utilizing LFMP: lithium metal oxide blends, particularly where LFMP has a Mn content which is less than or equal to the Fe content or less than or equal to 0.500.

First, Applicants have surprisingly found that an electroactive material, such as the positive electrode material, formed by blending an LFMP, where the Mn content is less than or equal to the Fe content or less than or equal to 0.500, with a lithium metal oxide, has improved energy density and better thermal safety. The resulting mixture has higher energy density than the lithium transition metal phosphate compound as well as improved thermal safety over that of the lithium metal oxide, such as reduction or minimization of the thermal run away issue associated with the lithium metal oxides.

The mixed positive electroactive material as disclosed herein has also improved safety and abuse tolerance compared with lithium transition meal oxide material. In some specific embodiments, the mixed positive electroactive material do not show the exothermic peak around 260° C. as shown in a DSC spectrum. The absence of this peak can be expected to correspond to better safety profile under high temperature conditions. This is highly surprising since a component of the mixed positive electroactive material is lithium transition metal oxide material, which is known to have an exothermic peak around 260° C. in a DSC spectrum. Without wishing to be bound by any particular theory, the absence of this peak around 260° C. may be related to better thermal safety of the material. Other cell shut down mechanisms may trigger before this critical temperature is reached and prevent temperature runaway from occurring.

The mixed positive electrode comprising lithium metal oxide material and LFMP material exhibits an improved safety profile as shown by FIG. 1. As shown, a lithium metal oxide cathode has a thermal peak shown on the DSC chart indicating an exothermic output between 250 to 300° C. In contrast, in an LFMP:oxide blend cathode, such thermal peak between 250 to 300° C. is no longer present. The disappearance of this thermal peak indicates that the mixed cathode materials have a better safety as the cathode no longer has an exothermic reaction at the temperature range between about 250 to about 300° C.

Without being bound to any particular theory, the presence of the exothermic peak on the DSC chart for lithium metal oxide material may be associated with the release of radical oxygen by the lithium metal oxide at high temperatures. These generated radical oxygen species are highly reactive and may oxidize other components and materials of the cell, e.g., the electrolyte. Suitable materials for use in an electrolyte may include various organic carbonates which may react with the radical oxygen species, resulting in exothermal reactions damaging the cell. Also without being bound to any particular theory, it is believed that the Fe in LFMP maybe be in its charged, delithiated state which is easily transformable to iron oxide e.g. $Fe_2O_3$ by the radical oxygen. Such "trapping" of the radical oxygen by Fe may prevent the radical oxygen from reacting with the electrolyte and other component of the cell.

This protective effect of the iron material may be further improved due to the nanoscale size of the LFMP material. Due to its large specific surface area, the reaction rate of Fe with radical oxygen is greatly improved so that the oxygen is efficiently trapped by Fe to prevent any further oxidation effect of the radical oxygen.

Second, when considering a blended cathode with different voltage materials, it is important to match the voltage of each material to achieve a smooth voltage profile for system use. For example, blending LFP ($LiFePO_4$) powder with oxide cathode materials such as NCA and NCM remains difficult for systems which need a smooth voltage in the operating range (see FIG. 2), because LFP has flatter and lower voltage than metal oxide cathode. Accordingly, there is a big step change in the voltage profile at the transition from higher voltage side of NCM to lower voltage of LFP.

Third, there are other lithium metal phosphate materials which have higher voltage plateaus such as $LiCoPO_4$ (4.8V) and $LiNiPO_4$ (5V). However, such phosphate materials operate at too high a voltage, which can cause decomposition of conventional electrolyte. Other lithium metal phosphate, such as $LiMnPO_4$, while having a lower voltage plateau (4.1V), has high impedance and is difficult to use for practical applications.

In accordance with certain embodiments, LFMP is blended with lithium metal oxide. As shown in FIG. 2, LFMP has two voltage plateaus of 4.1V(Mn) and 3.4V(Fe). Accordingly, one general expectation is that since the redox potential of Mn in the olivine structure (about 4.0V vs. Li) is approximately 0.5V higher than that of Fe (3.5V vs. Li), Mn-rich Li—Fe—Mn phosphate (LFMP) materials should achieve improved properties, such as energy density and specific capacity. Accordingly, it was conventionally believed that higher content of Mn in LFMP provides higher energy density and specific capacity. Hence, in blends of LFMP with lithium metal oxides that are being carried out to improve the energy density, one of ordinary skill in the art would have attempted to mix in LFMP having high Mn contents. However, surprisingly and contrary to conventional wisdom, improved properties of compounds can be obtained, such as energy density and specific capacity, of positive electrode LFMP material having lower levels of Mn, and, for example, where the molar amount of Mn in the LFMP is less than 50%, 45%, or 40%.

Figure 3:
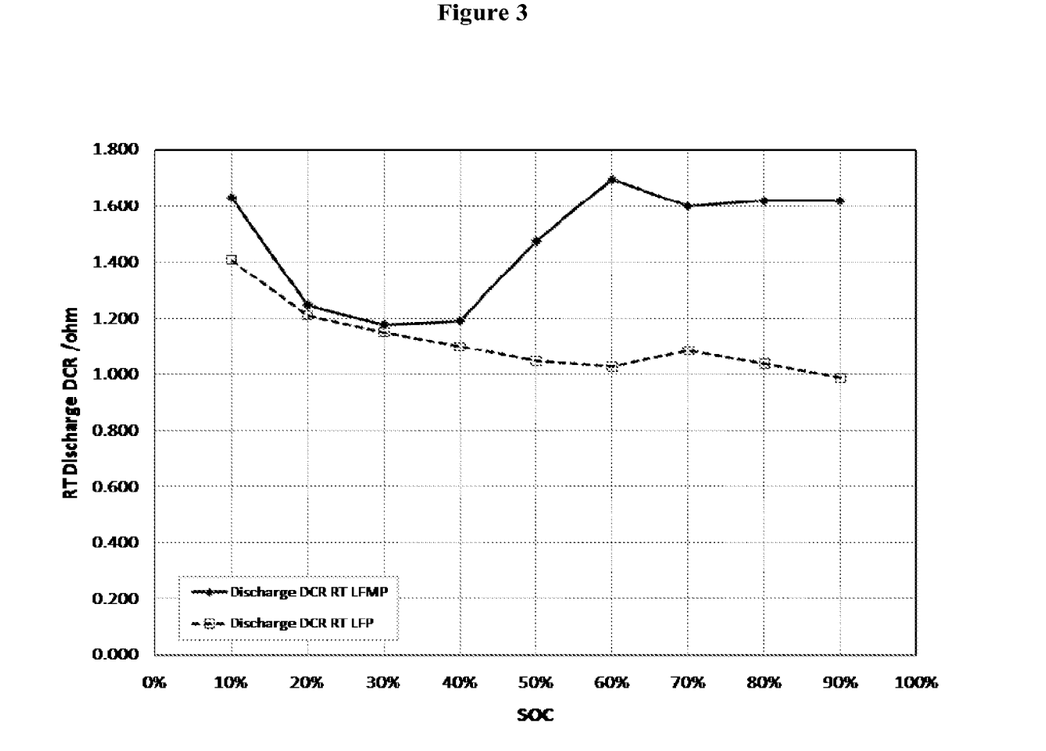
FIG. 3 is a plot of room temperature discharge DCR of Nanophosphate $LiFePO_4$® (LFP) (♦) and $LiFe_{0.55}Mn_{0.45}PO_4$ (□).

In addition to the unconventional thinking, LFMP and lithium metal oxide blends utilizing LFMP having Mn content that is less than 50% provides additional benefits. For example, as shown in FIG. 3, Mn plateau has higher impedance and is difficult to use for high power automotive applications. Thus, Applicants have surprisingly found that, although a higher Mn ratio can provide slightly higher energy at extremely low rate or elevated temperatures, high Mn content in the LFMP may not be needed for practical automotive use and for high power applications. In addition, LFMP materials with higher Mn ratio may be less stable in hot electrolyte due to Mn dissolution resulting worse performance in high temperature cycling and storage. Hence, as demonstrated herein, higher energy density is achieved without losing safety by blending in with NCM while using lower Mn content LFMP.

Figure 4:
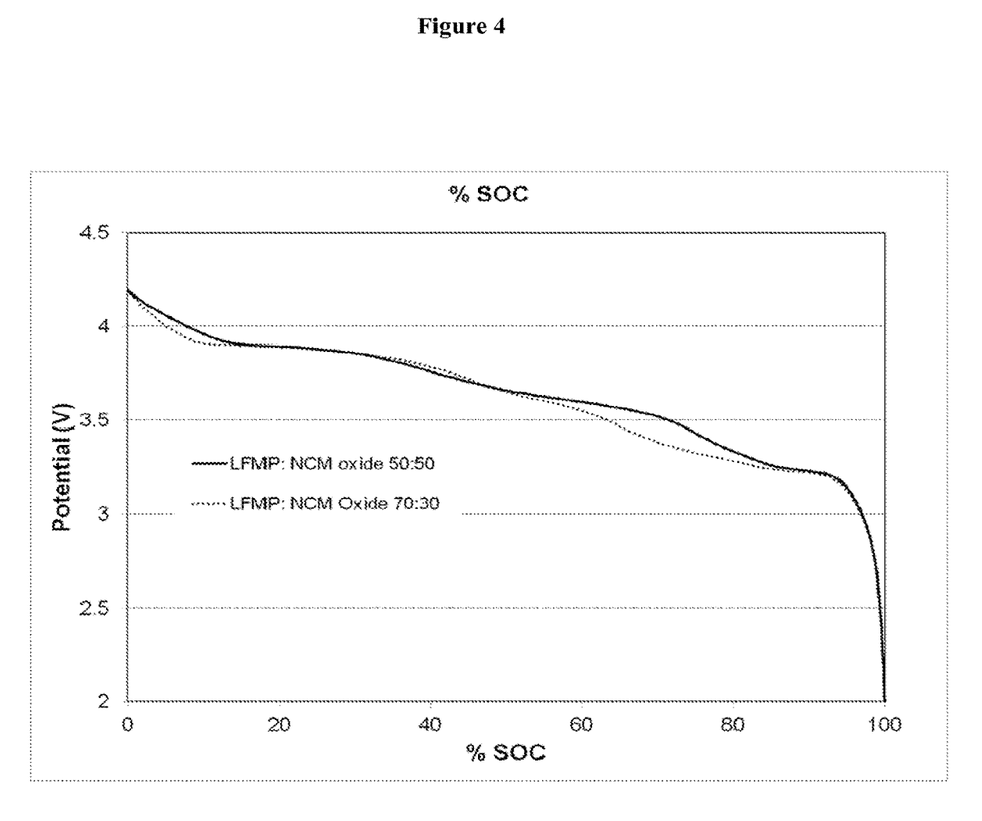
FIG. 4 is a plot of specific energy of LFMP:NCM (70:30) blend and LFMP:NCM (50:50) blend.

Thus, based on these unexpected observations, it was further unexpectedly observed that LFMP with a Mn content that is less than 0.500 provides a smooth voltage matching with the higher voltage NCM material, as shown in FIG. 2. Particularly, the LFMP-NCM blend cathode shows a relatively smooth voltage profile compared to LFP-NCM blend or LFMP itself. That is, the 50% or lower Mn content LFMP blended with lithium metal oxides show a relatively smooth voltage profile at the beginning and end of discharge. As shown in FIG. 4, the smooth voltage profile can be observed in blends having at least two different ratios of LFMP:NCM, such as 50:50 and 70:30.

Moreover, it was unexpectedly realized that by selecting LFMP that has a Mn content that is less than 0.500, more NCM material can be added to the blend. As a result, in addition to the smooth voltage profile that is provided, the blend is able to achieve higher energy than LFP:NCM, LFP, and LFMP materials.

In other aspects of the invention, a lithium metal oxide may be blended with lithium transition metal polyanion compounds, such as $LiCoPO_4$, $Li_2CoPO_4F$, $LiMnPO_4$, $Li_2MnPO_4F$, $Li_3V_2(PO_4)_3$, $LiVPO_4F$ and mixed transition metal phosphate.

Upon review of the description and embodiments described above, those skilled in the art will understand that modifications and equivalent substitutions may be performed in carrying out the invention without departing from the essence of the invention. Thus, the invention is not meant to be limiting by the embodiments described explicitly above.

What is claimed is:

1. A positive electroactive material, comprising: a nanoscale lithium transition metal phosphate material comprising at least an olivinic phase that includes lithium (Li), iron (Fe), manganese (Mn), one or more dopants (D), and phosphate ($PO_4$), where an overall composition is $Li_aFe_{1-x-y}Mn_xD_y(PO_4)_z$, wherein $0.350 \leq x < 0.600$, $0 < y \leq 0.100$, $1.0 < a \leq 1.05$, and $1.0 < z \leq 1.025$ and D is selected from the group consisting of Co, Ni, V, Nb, and combinations thereof; and a lithium metal oxide,
wherein the lithium metal oxide has a specific surface area of less than about 10 $m^2/g$,
wherein the nanoscale lithium transition metal phosphate material has a conductivity of at least about $10^{-8}$ S/cm,
wherein the nanoscale lithium transition metal phosphate material is optionally doped with Ti, Zr, Nb, Al, Ta, W, Mg, or F,
wherein a weight ratio of the nanoscale lithium transition metal phosphate material to the lithium metal oxide is between 50:50 and 70:30, and
wherein the nanoscale lithium transition metal phosphate material is in the form of particulates, the particulates having a small size and a correspondingly high specific surface area; wherein
the small size is about 75 nm or less, and
the high specific surface area is greater than about 15 $m^2/g$.

2. The positive electroactive material of claim 1, wherein the nanoscale lithium transition metal phosphate material is $Li_aFe_{1-x-y}Mn_xD_y(PO_4)_z$ and $0.350 \leq x < 0.500$.

3. The positive electroactive material of claim 1, wherein the nanoscale lithium transition metal phosphate material is $Li_aFe_{1-x-y}Mn_xD_y(PO_4)_z$ and $0.350 \leq x < 0.450$.

4. The positive electroactive material of claim 1, wherein the nanoscale lithium transition metal phosphate material is $Li_aFe_{1-x-y}Mn_xD_y(PO_4)_z$ and $0.350 \leq x < 0.500$ and $0.001 < y < 0.100$.

5. The positive electroactive material of claim 1, wherein the nanoscale lithium transition metal phosphate material is $Li_aFe_{1-x-y}Mn_xD_y(PO_4)_z$ and $0.350 \leq x < 0.500$ and $0.001 < y < 0.050$.

6. The positive electroactive material of claim 1, wherein the nanoscale lithium transition metal phosphate material is $Li_aFe_{1-x-y}Mn_xD_y(PO_4)_z$ and $0.350 \leq x < 0.500$ and $0.001 < y < 0.050$.

7. The positive electroactive material of claim 1, wherein the nanoscale lithium transition metal phosphate material is $Li_aFe_{1-x-y}Mn_xD_y(PO_4)_z$ and $0.350 \leq x < 0.500$ and $0.001 < y < 0.050$.

8. The positive electroactive material of claim 1, wherein the nanoscale lithium transition metal phosphate material is $Li_aFe_{1-x-y}Mn_xD_y(PO_4)_z$ and $0.350 \leq x < 0.500$ and $0.001 < y < 0.050$.

9. The positive electroactive material of claim 1, wherein the nanoscale lithium transition metal phosphate material is one or more electroactive materials selected from the group consisting of:

$Li_{1.050}Fe_{0.500}Mn_{0.450}Co_{0.010}Ni_{0.010}V_{0.030}(PO_4)_{1.025}$,
$Li_{1.040}Fe_{0.560}Mn_{0.400}Co_{0.010}Ni_{0.010}V_{0.020}(PO_4)_{1.015}$,
$Li_{1.040}Fe_{0.510}Mn_{0.450}Co_{0.010}Ni_{0.010}V_{0.020}(PO_4)_{1.015}$,
$Li_{1.030}Fe_{0.520}Mn_{0.450}Co_{0.010}Ni_{0.010}V_{0.010}(PO_4)_{1.005}$,
$Li_{1.040}Fe_{0.510}Mn_{0.450}Co_{0.010}Ni_{0.010}V_{0.030}(PO_4)_{1.010}F_{0.015}$,
$Li_{1.050}Fe_{0.510}Mn_{0.450}Co_{0.0100}Ni_{0.005}V_{0.020}(PO_4)_{1.020}$,
$Li_{1.050}Fe_{0.500}Mn_{0.450}Co_{0.010}Nb_{0.010}V_{0.030}(PO_4)_{1.025}$,
$Li_{1.040}Fe_{0.560}Mn_{0.400}Co_{0.010}Nb_{0.010}V_{0.020}(PO_4)_{1.015}$,
$Li_{1.040}Fe_{0.510}Mn_{0.450}Co_{0.010}Nb_{0.010}V_{0.020}(PO_4)_{1.015}$,
$Li_{1.030}Fe_{0.520}Mn_{0.450}Co_{0.010}Nb_{0.010}V_{0.010}(PO_4)_{1.005}$, $Li_{1.040}Fe_{0.510}Mn_{0.450}Co_{0.010}Nb_{0.010}V_{0.030}(PO_4)_{1.010}F_{0.015}$, and $Li_{1.050}Fe_{0.510}Mn_{0.450}Co_{0.0100}Nb_{0.005}V_{0.025}(PO_4)_{1.020}$.

10. The positive electroactive material of claim 1, wherein the lithium metal oxide is selected from the group consisting of lithium nickel cobalt aluminum oxide (NCA), lithium nickel cobalt magnesium oxide (NCMg), lithium nickel cobalt manganese oxide (NCM), lithium nickel cobalt rare earth oxide (NCRE), spinel lithium manganese oxide (LMO), layered layered oxide cathode (LLC), lithium cobalt oxide (LCO), layered Mn oxide, and combinations thereof.

11. The positive electroactive material of claim 1, wherein the lithium metal oxide is a lithium nickel cobalt manganese oxide (NCM).

12. The positive electroactive material of claim 1, wherein the lithium metal oxide is a lithium nickel cobalt aluminum oxide (NCA).

13. The positive electroactive material of claim 1, wherein the lithium metal oxide is lithium nickel cobalt manganese oxide (NCM) and the nanoscale lithium transition metal phosphate material is $Li_aFe_{1-x-y}Mn_xD_y(PO_4)_z$, wherein $0.350 \leq x < 0.500$.

14. The positive electroactive material of claim 1, further comprising additional lithium transition metal polyanion materials.

15. The positive electroactive material of claim 1, wherein the positive electroactive material comprises from about 40-70% of the nanoscale lithium transition metal phosphate material.

16. The positive electroactive material of claim 1,
wherein the nanoscale lithium transition metal phosphate material is in the form of a particulate;
wherein the lithium metal oxide is in the form of a particulate; and
wherein a ratio of the specific surface area of the nanoscale lithium transition metal phosphate material to the specific surface area of the lithium metal oxide is between about 1.5 and 100.

17. A positive electroactive material, comprising: a doped nanoscale lithium transition metal phosphate material having at least an olivinic phase that comprises lithium (Li), iron (Fe), manganese (Mn), one or more dopants (D), and phosphate ($PO_4$), where an overall stoichiometric composition includes v amount of Li, w amount of Fe, x amount of Mn, y amount of D, and z amount of $PO_4$, where w+x+y=1.0, a ratio of v:(w+x+y) ranging from about 1.0 to about 1.05, a ratio of z:(w+x+y) ranging from about 1.0 to about 1.025, and D is one or more metals selected from the group consisting of cobalt (Co), nickel (Ni), vanadium (V), niobium (Nb), and mixtures thereof, and x ranges from about 0.350 to less than 0.600; and
a lithium metal oxide,
wherein the lithium metal oxide has a specific surface area of less than about 10 $m^2/g$,
wherein the nanoscale lithium transition metal phosphate material is optionally doped with Ti, Zr, Nb, Al, Ta, W, Mg, or F,
wherein a weight ratio of the nanoscale lithium transition metal phosphate material to the lithium metal oxide is between 50:50 and 70:30, and
wherein the nanoscale lithium transition metal phosphate material is in the form of particulates having a size of about 75 nm or less, and
wherein the nanoscale lithium transition metal phosphate material particulates have a specific surface area greater than about 15 $m^2/g$ to form a high surface to volume ratio relative to the size of the particulates.

18. The positive electroactive material of claim 17, wherein x ranges from 0.400 to 0.550 and y ranges from 0.005 to 0.05.

19. The positive electroactive material of claim 17, wherein the nanoscale lithium transition metal phosphate material is one or more electroactive materials selected from the group consisting of:
$Li_{1.025}Fe_{0.580}Mn_{0.400}Co_{0.020}PO_4$, and
$Li_{1.025}Fe_{0.530}Mn_{0.450}Co_{0.020}PO_4$.

20. The positive electroactive material of claim 17, wherein the lithium metal oxide is selected from the group consisting of lithium nickel cobalt aluminum oxide (NCA), lithium nickel cobalt magnesium oxide (NCMg), lithium nickel cobalt manganese oxide (NCM), lithium nickel cobalt rare earth oxide (NCRE), spinel lithium manganese oxide (LMO), layered layered oxide cathode (LLC), lithium cobalt oxide (LCO), layered Mn oxide, and combinations thereof.

21. The positive electroactive material of claim 17, further comprising additional lithium transition metal polyanion materials.

22. The positive electroactive material of claim 17, wherein the positive electroactive material comprises from about 40-70% of the nanoscale lithium transition metal phosphate material.

* * * * *